(12) United States Patent
Zhu

(10) Patent No.: US 12,425,249 B2
(45) Date of Patent: Sep. 23, 2025

(54) DIVIDING DATA STORAGE AND SERVICE OPERATIONS AMONG PLURAL BLOCKCHAINS

(71) Applicant: Tencent Technology (Shenzhen) Company Limited, Guangdong (CN)

(72) Inventor: Gengliang Zhu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 167 days.

(21) Appl. No.: 18/379,648

(22) Filed: Oct. 12, 2023

(65) Prior Publication Data

US 2024/0129143 A1 Apr. 18, 2024

Related U.S. Application Data

(63) Continuation of application No. PCT/CN2023/112033, filed on Aug. 9, 2023.

(30) Foreign Application Priority Data

Oct. 14, 2022 (CN) .......................... 202211260878.X

(51) Int. Cl.
*H04L 9/00* (2022.01)
*H04L 9/32* (2006.01)

(52) U.S. Cl.
CPC .............. *H04L 9/50* (2022.05); *H04L 9/3247* (2013.01); *H04L 9/3268* (2013.01)

(58) Field of Classification Search
None
See application file for complete search history.

(56) References Cited

U.S. PATENT DOCUMENTS

2019/0251199 A1* 8/2019 Klianev ................. G06Q 40/04
2019/0305966 A1* 10/2019 Qiu ........................ H04L 9/3239
(Continued)

FOREIGN PATENT DOCUMENTS

CN 113689216 A 11/2021

OTHER PUBLICATIONS

Avalanche Dev Docs, https://docs.avax.network/, 2 pages.
(Continued)

*Primary Examiner* — Backhean Tiv
(74) *Attorney, Agent, or Firm* — ARENTFOX SCHIFF LLP

(57) ABSTRACT

A multi-blockchain processing method includes receiving a first service request from a first service node, and invoking a first cross-chain reading contract on a first chain to read first service associated information from a target chain. The method further includes invoking, by a first consensus node, a first service processing contract to perform the first service and obtain service data as a first service execution result, and writing the first service execution result to the first chain. The method further includes reading, by the first consensus node, the service data from the first chain based on a second service indicated in a cross-chain reading request, and returning the service data to a second consensus node configured to write a second service execution result generated by the second service to the second chain after performing the second service based on the service data generated by the first service.

20 Claims, 10 Drawing Sheets

(56) References Cited

U.S. PATENT DOCUMENTS

| | | | | |
|---|---|---|---|---|
| 2019/0340266 A1* | 11/2019 | Vo | ........................ | G06F 16/2365 |
| 2019/0340267 A1* | 11/2019 | Vo | ........................ | G06F 16/2365 |
| 2021/0117971 A1* | 4/2021 | Lu | ............................ | H04L 9/50 |
| 2021/0311934 A1* | 10/2021 | Fang | ..................... | H04L 9/3247 |
| 2021/0326869 A1* | 10/2021 | Fang | ..................... | G06F 21/64 |
| 2021/0398116 A1* | 12/2021 | Fang | ................ | G06Q 20/38215 |
| 2023/0299984 A1* | 9/2023 | Zhu | .......................... | H04L 9/50 |
| | | | | 713/168 |

OTHER PUBLICATIONS

Anonymous: "X.509", Dec. 18, 2017 (Dec. 18, 2017), XP055472704, 14 pages.

Extended European Search Report received for European Patent Application No. 23790529.4, mailed on Mar. 22, 2024, 11 pages.

Saleem et al., "ProofChain: An X.509-compatible blockchain-based PKI framework with decentralized trust", Computer Networks, Elsevier, Amsterdam, NL, XP087138752, ISSN: 1389-1286, vol. 213, Jun. 6, 2022 (Jun. 6, 2022), 18 pages.

Symantec Corporation, "E-security begins with sound security policies", Announcement Symantec, XX, XX, Jun. 14, 2001 (Jun. 14, 2001), XP002265695, 23 pages.

\* cited by examiner

DIVIDING DATA STORAGE AND SERVICE OPERATIONS AMONG PLURAL BLOCKCHAINS

RELATED APPLICATIONS

This application is a continuation of International Application No. PCT/CN2023/112033, filed on Aug. 9, 2023, which claims priority to Chinese Patent Application No. 202211260878.X, entitled "MULTI-BLOCKCHAIN DATA PROCESSING METHOD AND APPARATUS, DEVICE, SYSTEM, AND MEDIUM", filed on Oct. 14, 2022. The disclosures of the prior applications are hereby incorporated by reference in their entirety.

FIELD OF THE TECHNOLOGY

This application relates to the field of blockchain technologies, including a multi-blockchain data processing method and apparatus, a device, a system, and a medium.

BACKGROUND OF THE DISCLOSURE

A related blockchain data processing system processes a related service (for example, a service A and an extended service B of the service A) based on a blockchain network constructed on a single-chain structure. Therefore, each service processing party accessing the blockchain network in a form of a terminal or a server needs to process the related service (for example, the service A and the extended service B) on a same blockchain corresponding to the blockchain network.

SUMMARY

Embodiments of this disclosure provide a multi-blockchain data processing method and apparatus, a device, a system, and a medium.

In an embodiment, a multi-blockchain data processing method includes receiving a first service request from a first service node, and invoking a first cross-chain reading contract on a first chain to read first service associated information from a target chain. The first chain is a blockchain in a first chain network, the target chain being a blockchain in a target chain network independent of the first chain network. The method further includes, in response to determining, based on the first service associated information, that the first service node has first service processing permission corresponding to the first service, invoking, by a first consensus node in the first chain network, a first service processing contract on the first chain to perform the first service and obtain a first service execution result comprising service data generated by the first service, and writing the first service execution result to the first chain. The method further includes, in response to obtaining a cross-chain reading request transmitted by a second consensus node based on a second cross-chain reading contract on a second chain, reading, by the first consensus node, the service data from the first chain based on a second service indicated in the cross-chain reading request, and returning at least a portion of the service data to the second consensus node. The second consensus node is configured to write a second service execution result generated by the second service to the second chain after performing the second service based on the at least a portion of the service data generated by the first service. The second chain is a blockchain in a second chain network comprising the second consensus node, and the second chain network being independent of the first chain network and the target chain network.

In an embodiment, a multi-blockchain data processing method includes receiving a second service request from a second service node, and invoking a second cross-chain reading contract on a second chain to read second service associated information from a target chain. The second chain is a blockchain in a second chain network, the target chain being a blockchain in a target chain network independent of the second chain network. The method further includes, in response to determining, based on the second service associated information, that the second service node has a second service processing permission corresponding to the second service, invoking, by a second consensus node, a second cross-chain reading contract to generate a cross-chain reading request associated with the second service, and transmitting the cross-chain reading request to a first consensus node in a first chain network. The cross-chain reading request requests the first consensus node to read service data associated with the second service from a first chain corresponding to the first chain network independent of the second chain network and the target chain network. The service data associated with the second service is obtained by the first consensus node by invoking a first service processing contract on the first chain in response to determining, based on the first service associated information, that a first service node has a first service processing permission corresponding to a first service. The first service associated information is read by the first consensus node from the target chain by invoking a first cross-chain reading contract on the first chain based on the first service.

In an embodiment, a multi-blockchain data processing apparatus includes processing circuitry of a first consensus node in a first chain network, the processing circuitry being configured to receive a first service request from a first service node, and invoke a first cross-chain reading contract on a first chain to read first service associated information from a target chain. The first chain is a blockchain in the first chain network, the target chain being a blockchain in a target chain network independent of the first chain network. The processing circuitry is further configured to, in response to determining, based on the first service associated information, that the first service node has a first service processing permission corresponding to the first service, invoke a first service processing contract on the first chain to perform the first service and obtain a first service execution result comprising service data generated by the first service, and write the first service execution result to the first chain. The processing circuitry is further configured to, in response to obtaining a cross-chain reading request transmitted by a second consensus node based on a second cross-chain reading contract on a second chain, read the service data from the first chain based on a second service indicated in the cross-chain reading request, and return at least a portion of the service data to the second consensus node. The second consensus node is configured to write a second service execution result generated by the second service to the second chain after performing the second service based on the at least a portion of the service data generated by the first service. The second chain is a blockchain in a second chain network comprising the second consensus node, and the second chain network being independent of the first chain network and the target chain network.

In the embodiments of this disclosure, the first consensus node in the first chain network may invoke, in response to obtaining the first service requested by the first service object, the first cross-chain reading contract on the first chain based on the first service to read the first service associated information associated with the first service from the target chain. The first chain is a blockchain in the first chain network. The target chain is a blockchain in the target chain network independent of the first chain network. The first chain is different from the target chain. Further, the first consensus node in the first chain network may invoke, in response to determining, based on the first service associated information, that the first service object has the first service processing permission corresponding to the first service, the first service processing contract on the first chain to perform the first service, to obtain the first service execution result associated with the first service, and write the first service execution result to the first chain. The first service execution result includes the service data indicated by the first service. Further, the first consensus node in the first chain network may further read, in response to obtaining the cross-chain reading request transmitted by the second consensus node based on the second cross-chain reading contract on the second chain, the service data from the first chain based on the second service carried in the cross-chain reading request, and return the core data in the service data to the second consensus node. It is to be understood that the second consensus node herein is configured to write the second service execution result corresponding to the second service to the second chain after performing the second service based on the core data. The second chain is a blockchain in the second chain network including the second consensus node. The second chain network is independent of the first chain network and the target chain network. Thus, it can be seen that the embodiments of this disclosure provide a completely new multi-blockchain cooperation mechanism. The multi-blockchain cooperation mechanism aims to emphasizing that it may be ensured through cooperation between three chains, that is, the first chain, the target chain, and the second chain, that a consensus node (that is, the first consensus node) in the first chain network may be configured to independently process a real-time service flow including some first services with large request data volumes. Therefore, in a service scenario of core data circulation of a blockchain, the first consensus node may participate in maintaining the first chain in the first chain network, and the first chain is mainly used for storing service data obtained by performing each first service in the real-time service flow. In addition, the second consensus node may participate in maintaining the second chain in the second chain network, and the second chain is mainly used for storing the second service execution result. The second service execution result herein is determined based on the second service performed based on the core data (that is, some data that is visible to the authorized in the service data) in the service data circulated from the first chain to the second chain in a cross-chain manner. In addition, the target consensus node herein may be configured to perform centralized management on a permission (for example, an identity permission and a service permission) of a service object accessing the second chain network and the first chain network. It is clear that separate data storage with a plurality of deployed blockchains can effectively reduce a mixing degree of data storage on each blockchain. In addition, cooperation between the plurality of blockchains can improve security of data stored on each blockchain.

DESCRIPTION OF EMBODIMENTS

Figure 1:
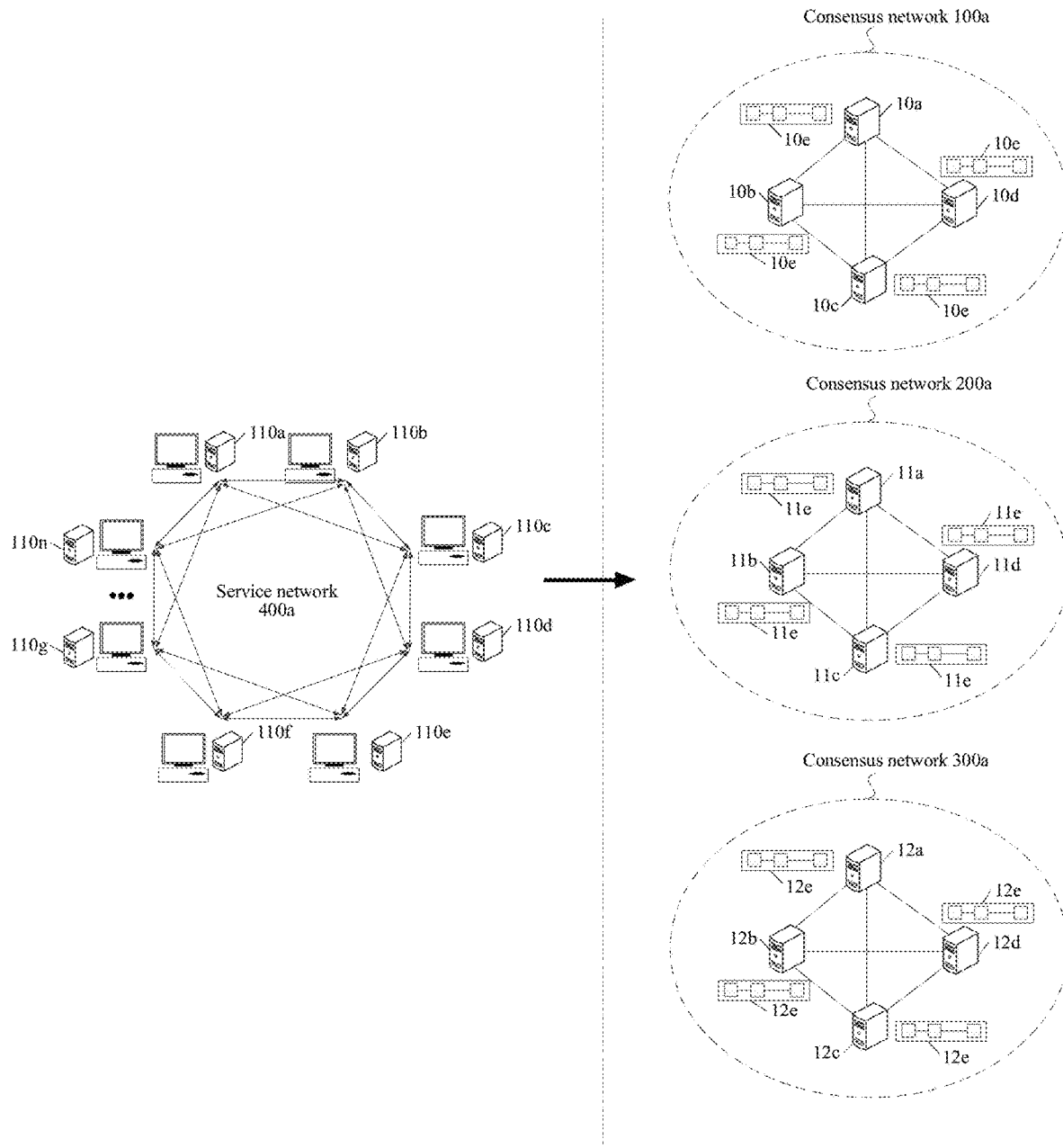
FIG. 1 is a schematic diagram of a layered structure of a blockchain network according to an embodiment of this disclosure.

Refer to FIG. 1. FIG. 1 is a schematic diagram of a layered structure of a blockchain network according to an embodiment of this disclosure. The layered structure shown in FIG. 1 is applied to a blockchain system corresponding to a multi-service cooperative processing platform. A blockchain network corresponding to the blockchain system includes a service network deployed in a public network and a plurality of consensus networks deployed in a private cloud. As shown in FIG. 1, the service network herein may be a service network 400a shown in FIG. 1. The plurality of consensus networks herein may specifically include a consensus network 100a, a consensus network 200a, and a consensus network 300a shown in FIG. 1.

A plurality of service nodes are deployed in the service network 400a shown in FIG. 1. The plurality of service nodes herein may specifically include a service node 110a, a service node 110b, a service node 110c, a service node 110d, a service node 110e, a service node 110f, a service node 110g, . . . , and a service node 110n shown in FIG. 1. As shown in FIG. 1, each service node running in the service network 400a may access one or more of the plurality of consensus networks in a network communication form. The consensus networks may also perform data interaction with each other in the network communication form.

It is to be understood that a plurality of consensus nodes are deployed in the consensus network 100a shown in FIG. 1. The plurality of consensus nodes herein may specifically include a consensus node 10a, a consensus node 10b, a consensus node 10c, and a consensus node 10d shown in FIG. 1. As shown in FIG. 1, a blockchain jointly maintained by the plurality of consensus nodes running in the consensus network 100*a* is specifically a blockchain 10*e* shown in FIG. 1.

Similarly, a plurality of consensus nodes are deployed in the consensus network 200*a* shown in FIG. 1. A blockchain jointly maintained by the plurality of consensus nodes running in the consensus network 200*a* is specifically a blockchain 11*e* shown in FIG. 1.

By analogy, a plurality of consensus nodes are deployed in the consensus network 300*a* shown in FIG. 1. A blockchain jointly maintained by the plurality of consensus nodes running in the consensus network 300*a* is specifically a blockchain 12*e* shown in FIG. 1.

For ease of understanding, in the embodiments of this disclosure, the service node and the consensus node that are located in the blockchain system may be collectively referred to as blockchain nodes (nodes for short), the consensus network 100*a*, the consensus network 200*a*, and the consensus network 300*a* participating in formation of the blockchain system may be collectively referred to as core consensus networks, and each node in the core consensus network may be collectively referred to as a core node.

For ease of distinguishing each core consensus network in the blockchain system corresponding to the multi-service cooperative processing platform, in the embodiments of this disclosure, with reference to a specific application scenario (for example, an electronic bill core data circulation scenario under a blockchain electronic bill platform) of the multi-service cooperative processing platform, the consensus network 100*a* may be collectively referred to as a target chain network, the blockchain 10*e* jointly maintained by the consensus nodes in the target chain network may be collectively referred to as a target chain, and a consensus node selected from the target chain network to perform a management service (for example, a registration service and an authorization service) may be used as a target consensus node in the target chain network. Similarly, it may be understood that in the embodiments of this disclosure, the consensus network 200*a* may be collectively referred to as a first chain network, the blockchain 11*e* jointly maintained by the consensus nodes in the first chain network may be collectively referred to as a first chain, and a consensus node selected from the first chain network to perform a first service (the first service may be specifically a bill service associated with an electronic bill, for example, an electronic bill issuing service) may be used as a first consensus node in the target chain network. By analogy, in the embodiments of this disclosure, the consensus network 300*a* may be collectively referred to as a second chain network, the blockchain 12*e* jointly maintained by the consensus nodes in the second chain network may be collectively referred to as a second chain, and a consensus node selected from the second chain network to perform a second service (the second service may be specifically a derivative service associated with an electronic bill, for example, an enterprise qualification recognition service) may be used as a second consensus node in the target chain network. It is to be understood that for each core consensus network, all the management service, the bill service, and the derivative service herein may be considered as transaction services of a transaction initiated by a corresponding service object.

For example, when the blockchain system is applied to the blockchain electronic bill platform, a secure and reliable blockchain electronic bill three-chain network may be constructed based on the target chain, the first chain, and the second chain. In the blockchain electronic bill three-chain network, when the foregoing services are independently performed in the three consensus networks, service execution results obtained by independently performing the foregoing services may be stored in blockchain ledgers of the corresponding blockchains respectively. Therefore, mixed data storage on each chain can be avoided from the source.

Specifically, for example, when the consensus network 100*a* is used as a target chain network, and the target chain network is the target chain network in the blockchain electronic bill three-chain network, the blockchain 10*e* stored on each node (for example, a core node like the consensus node 10*a*, the consensus node 10*b*, the consensus node 10*c*, and the consensus node 10*d*) in the consensus network 100*a* is the foregoing target chain. The target chain herein may be specifically a management chain in the target chain network. The management consensus node (or a target core node) determined from a management chain network may be collectively referred to as a target consensus node. For another example, when the consensus network 200*a* is used as a first chain network, and the first chain network is a bill chain network in the blockchain electronic bill three-chain network, the blockchain 11*e* stored on each node (for example, a core node like the consensus node 11*a*, the consensus node 11*b*, the consensus node 11*c*, and the consensus node 11*d*) in the consensus network 200*a* is the first chain. The first chain herein may be specifically a bill chain in the blockchain system. A bill consensus node (or a first core node) determined from the bill chain network may be collectively referred to as a first consensus node. That is, in the embodiments of this disclosure, a specific consensus node (that is, the foregoing bill consensus node) selected by using a consensus mechanism in the bill chain network from consensus nodes in the bill chain network may be used as the first consensus node, and a consensus node other than the first consensus node in the consensus nodes of the bill chain network may be collectively referred to as a verification consensus node (in this case, the verification consensus node is specifically a bill verification consensus node). For another example, when the consensus network 300*a* is used as a second chain network, and the second chain network is an application contract chain network in the blockchain electronic bill three-chain network, the blockchain 12*e* stored on each node (for example, a core node like the consensus node 12*a*, the consensus node 12*b*, the consensus node 12*c*, and the consensus node 12*d*) in the consensus network 300*a* is the second chain. The second chain herein may be specifically an application contract chain in the blockchain system. An application consensus node (or a second core node) determined from the application contract chain network may be collectively referred to as a second consensus node. That is, in the embodiments of this disclosure, a specific consensus node (that is, the foregoing application consensus node) selected by using a consensus mechanism in the second chain network from consensus nodes in the application contract chain network may be used as the second consensus node, and a consensus node other than the second consensus node in the consensus nodes of the application contract chain network may be collectively referred to as a verification consensus node (in this case, the verification consensus node is specifically an application verification consensus node).

In the blockchain system, a core node may be responsible for consensus in a core consensus network including a corresponding blockchain. That is, the core network may be a consensus node in the core consensus network including the corresponding blockchain. For any one of the three core consensus networks, a specific process of writing transaction data in the core consensus network to a corresponding blockchain ledger (for example, a distributed database) may be as follows: a user client transmits the transaction data to a specific service node. Then, the transaction data is transmitted between the service nodes in the service network in the blockchain network in a manner of a baton until a consensus node (for example, the consensus node 11*b* in the consensus network 200*a*) in the corresponding core consensus network in the blockchain network receives the transaction data. In this case, the consensus node (for example, the consensus node 11*b* in the consensus network 200*a*) packs the transaction data in a block for subsequent consensus with another consensus node. In this way, after a consensus is reached, the block for which the consensus is reached is written to the distributed database of the core consensus network (for example, the consensus network 200*a*) including the consensus node.

It may be understood that in the embodiments of this disclosure, after the consensus is reached, a storage layer of the core consensus network (for example, the consensus network 200*a*) including the consensus node may be write in parallel the block carrying the transaction data and a plurality of other blocks associated with the block to the distributed database. In this way, a limitation of a blockchain structure of a blockchain may be broken from the source, and storage efficiency of data storage can be further effectively improved.

It may be understood that in the blockchain system, a smart contract may be deployed on a blockchain of a corresponding core consensus network. For example, a user may initiate a transaction service request through a user client to invoke the smart contract deployed on the blockchain (for example, the blockchain 11*e*) of the corresponding core consensus network (for example, the consensus network 200*a*).

It is to be understood that one or more smart contracts may be deployed on the blockchain (for example, the blockchain 11*e*) of the core consensus network (for example, the consensus network 200*a*). In the blockchain system, if a smart contract specified by the user client is a smart contract used to read data in a cross-chain manner (that is, a cross-chain reading contract), each consensus node may request, based on a chain identifier specified by the cross-chain reading contract, to read the data from a corresponding blockchain. Finally, each consensus node may perform mutual verification to determine whether each transaction execution result obtained by performing a transaction based on information read in the cross-chain manner is consistent (that is, perform consensus). If the transaction execution result is consistent, the transaction execution result may be stored in a corresponding local cache and local storage, and the transaction execution result of the transaction service may be returned to the client.

It may be understood that in the embodiments of this disclosure, the target consensus node in the target chain network may configure a blockchain node may be configured for any character (for example, a physical object like any individual user, any enterprise, or any organization) accessing the blockchain network. Therefore, in the service network 400*a* shown in FIG. 1, the service node 110*a*, the service node 110*b*, the service node 110*c*, the service node 110*d*, . . . , and the service node 110*n* may be in one-to-one correspondence to corresponding characters that need to access the blockchain network respectively.

It may be understood that when the consensus network 100*a* is used as the target chain network, a consensus node (for example, the target consensus node, which may be the consensus node 10*a* shown in FIG. 1) located in the target chain network may provide, through a target chain network entry, the registration service and the authorization service for a corresponding character (or a corresponding object) accessing the target chain network, so as to perform, in the target chain network, identity management and permission management on the corresponding character (that is, the corresponding object) that needs to access the blockchain network (for example, the target chain network, the first chain network, or the second chain network). In addition, the target consensus node located in the target chain network may be configured to perform data management on related metadata information in the blockchain system, for example, may manage and update a contract template on the target chain (it is to be understood that the contract template on the target chain may specifically include a management contract template of a smart contract deployed on the target chain and an application contract template of a smart contract deployed on the second chain), manage and update a bill template recorded on the target chain, manage and update a tax calculation rule and the like that are associated with the bill template, control access traffic at a chain entry corresponding to the first chain, and control a quantity of consensus nodes participating in consensus on each chain, and the like.

For example, when needing to deploy a smart contract corresponding to a specific second service on the second chain, a developer and a tax service participant may access the second chain network through a chain entry (that is, a second chain entry) corresponding to the second chain, and further read, by using a contract template reading method in a cross-chain reading contract on the second chain, an application contract template corresponding to the second service from the target chain indicated by the contract template reading method, to deploy the smart contract corresponding to the second service on the second chain based on the read application contract template. In this way, when subsequently needing to perform the second service on the second chain, the tax service participant may perform the corresponding second service by using the deployed smart contract corresponding to the second service.

It is to be understood that when the consensus node 200*a* is used as the first chain network, a consensus node (for example, the first consensus node, which may be the consensus node 11*b* shown in FIG. 1) located in the first chain network may be configured to provide the first service. The first service herein may include but is not limited to the foregoing bill service associated with an electronic bill. The bill service herein may specifically include a service related to an electronic bill, for example, an electronic bill issuing service, an electronic bill circulation service, an electronic bill reversal service, or an electronic bill archiving service.

In addition, it may be further understood that when the consensus node 300*a* is used as the second chain network, a consensus node (for example, the second consensus node, which may be the consensus node 12*b* shown in FIG. 1) located in the second chain network may be configured to provide the second service (for example, a credit service, an import and export service, an enterprise qualification service, a social service, a credit buying service, a tax rebating service, or a lottery service) associated with the first service.

It may be understood that each physical object may correspond to one blockchain node. Therefore, in the embodiments of this disclosure, an example in which the physical object is the foregoing enterprise user (that is, the foregoing enterprise) may be used. In this case, a blockchain node associated with each enterprise user may be a same blockchain node (for example, the service node 110*c* shown in FIG. 1 may perform data interaction with user terminals corresponding to a plurality of enterprise users). For example, in the blockchain system, a first service (for example, the service related to an electronic bill like the electronic bill issuing service, the electronic bill circulation service, the electronic bill reversal service, or the electronic bill archiving service) requested by each enterprise user may be collectively referred to as a transaction service. When the enterprise user is a billing enterprise A that requests for billing through the first chain network (for example, the consensus network 200a), the enterprise user may perform data interaction with a consensus node (for example, the consensus node 11b) in the consensus network 200a through the service node 110c shown in FIG. 1, to request to complete a corresponding transaction. Similarly, a billing enterprise B may also perform data interaction with a consensus node (for example, the consensus node 11b) in the consensus network 200a through the service node 110c shown in FIG. 1, to request to complete a corresponding transaction. By analogy, a billing enterprise C may also perform data interaction with a consensus node (for example, the consensus node 11b) in the consensus network 200a through the service node 110c shown in FIG. 1, to request to complete a corresponding transaction.

It may be understood that in the embodiments of this disclosure, a physical object (for example, the billing enterprise A, the billing enterprise B, . . . , or the billing enterprise C) that transmits a transaction service request for the electronic bill service to the first chain network may be collectively referred to as a first service object. A blockchain node (for example, the service node 110c) associated with the first service object (for example, the billing enterprise A, the billing enterprise B, . . . , or the billing enterprise C) in the service network (for example, the service network 400a) may be collectively referred to as a first service node. A blockchain node that obtains the electronic bill issuing service indicated by the transaction service request in the core consensus network (for example, the consensus network 200a used as the first chain network) may be collectively referred to as the first consensus node.

It may be understood that when receiving the transaction service request associated with the bill service, the first consensus node associated with the first service object may forward the transaction service request initiated by the first service object to the first consensus node, to perform, through the first consensus node, validity verification on the transaction service request initiated by the first service object. In this way, when validity verification succeeds, the first consensus node adds a transaction service (for example, the bill service) requested by the first service object to a transaction pool, so that transaction data associated with the transaction service (for example, the bill service) may be subsequently packed into a block for block consensus between the consensus nodes in the consensus network 200a. Therefore, after block consensus succeeds, block data of the block may be written to a local cache and a local storage, to subsequently implement parallel storage of block data of a plurality of blocks based on the foregoing distributed storage.

Figure 2:
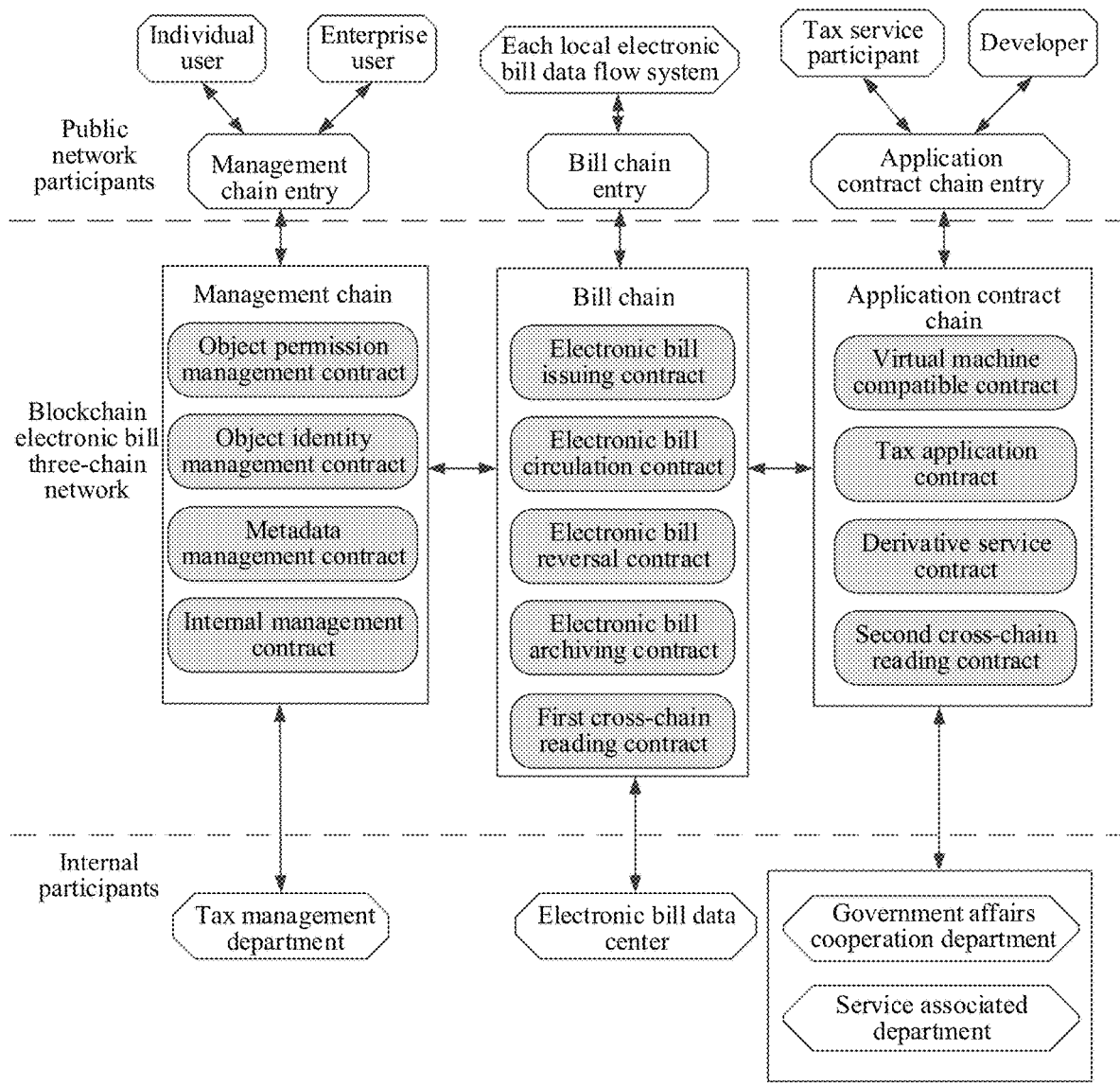
FIG. 2 is a schematic diagram of a scenario of a multi-blockchain-based blockchain electronic bill platform according to an embodiment of this disclosure.

For ease of understanding, further, refer to FIG. 2. FIG. 2 is a schematic diagram of a scenario of a multi-blockchain-based blockchain electronic bill platform according to an embodiment of this disclosure. The blockchain electronic bill platform may be the foregoing multi-service cooperative processing platform. To be specific, the blockchain electronic bill platform may be a specific service platform in the blockchain system. It is to be understood that in the blockchain electronic bill platform, a completely new blockchain electronic bill-based multi-chain system is provided, to reduce a mixing degree of data storage on chains. The multi-chain system mainly relates to the blockchain electronic bill three-chain network shown in FIG. 2. As shown in FIG. 2, a management chain, a bill chain, and an application contract chain are deployed in the blockchain electronic bill three-chain network. The management chain herein may be the foregoing target chain. The bill chain herein may be the foregoing first chain. The application contract chain herein may be the foregoing second chain.

It may be understood that in a service scenario of blockchain-based blockchain electronic bill core data circulation, a functional property of independently performing different services is provided for the entire blockchain electronic bill platform through cooperation between the management chain, the bill chain, and the application contract chain, so that a secure and efficient service flow system may be constructed on the premise of three-chain cooperation. It is to be understood that an example in which the multi-chain system is a three-chain system is used herein. In the three-chain system, the management chain, the bill chain, and the application contract chain are all independently constructed. To be specific, a consensus node configured to maintain the management chain is different from a consensus node configured to maintain the bill chain and a consensus node configured to maintain the application contract chain.

As shown in FIG. 2, the management chain deployed in the blockchain electronic bill three-chain network is independent of the bill chain and the application contract chain, that is, the three independently constructed blockchains are independent of each other. However, the three independently constructed blockchains may perform data interaction in a cross-chain manner, that is, cross-chain interaction may be performed between the three chains. For example, when a first cross-chain reading contract is deployed on the bill chain shown in FIG. 2, a consensus node participating in maintaining the bill chain (that is, the first consensus node) may read service associated information on the management chain through the first cross-chain reading contract in the cross-chain manner, to confirm a service permission. For another example, when a second cross-chain reading contract is deployed on the application contract chain shown in FIG. 2, a consensus node participating in maintaining the application contract chain (that is, the second consensus node) may read service associated information on the management chain through the second cross-chain reading contract in the cross-chain manner, to confirm a service permission, or may read core data (for example, bill information in an electronic bill on the bill chain) on the bill chain through the second cross-chain reading contract in the cross-chain manner to perform a corresponding derivative service (that is, the foregoing second service, for example, may perform a credit service based on the bill information read from the bill chain, to obtain enterprise credit information of a specific enterprise).

For example, the management chain herein may be configured to provide a management functional property for the entire blockchain electronic bill platform. The bill chain herein may provide functional properties of bill services (that is, the foregoing first service) of different service permission types for the entire blockchain electronic bill platform. It is to be understood that in the embodiments of this disclosure, it is proposed in the embodiments of this disclosure that a more normal, flexible and fully functional derivative service (that is, the foregoing second service) may be provided through another blockchain (that is, the application contract chain shown in FIG. 2) independent of the management chain and the bill chain. To be specific, the application contract chain herein may provide, for the entire blockchain electronic bill platform, a functional property of developing the derivative service based on the core data in the electronic bill.

For ease of understanding, an example in which a core consensus network including the management chain (that is, the management chain network) is the consensus network 100*a* shown in FIG. 1 is used herein. In this case, the consensus node participating in maintaining the management chain may be the foregoing management consensus node. As shown in FIG. 2, a plurality of smart contracts are deployed on the management chain, and these smart contracts may run on the management consensus node. Specifically, it may be understood that the plurality of smart contracts herein may specifically include an object permission management contract, an object identity management contract, a metadata management contract, and an internal management contract shown in FIG. 2. It is to be understood that these smart contracts deployed on the management chain are determined by an internal participant shown in FIG. 2 (that is, a tax management department) through corresponding management contract templates deployed on the corresponding chain (that is, the management chain).

It may be understood that the foregoing tax management department may perform a management function through the management consensus node deployed in the management chain network. For example, the management function herein may specifically include managing internal information of a government affairs department (for example, information about staff of the tax management department), managing a service logic rule of an overall service (for example, a derivative service contract running on the application contract chain to perform a service logic of the derivative service), managing metadata information of the overall service (for example, access traffic at each chain entry in the three-chain system), performing identity management and permission management on a participant of the overall service (for example, a service object like an individual user, an enterprise user, or a tax service participant), and the like. It is to be understood that in the blockchain network corresponding to the overall service, the management chain maintained by the management consensus node is a blockchain with higher stability, a smallest data scale, and highest security.

In addition, for ease of understanding, an example in which a core consensus network including the bill chain shown in FIG. 2 (that is, the bill chain network) is the consensus network 200*a* shown in FIG. 1 is used herein. In this case, the consensus node participating in maintaining the bill chain may be the foregoing first consensus node. As shown in FIG. 2, a plurality of smart contracts are deployed on the bill chain, and these smart contracts may run on the first consensus node. Specifically, it may be understood that the plurality of smart contracts herein may specifically include an electronic bill issuing contract, an electronic bill circulation contract, an electronic bill reversal contract, an electronic bill archiving contract, and a first cross-chain reading contract shown in FIG. 2. Similarly, it is to be understood that these smart contracts deployed on the bill chain are determined by the internal participant shown in FIG. 2 (that is, a tax department associated with an electronic bill data center) through corresponding management contract templates deployed on the management chain.

It may be understood that the first consensus node deployed in the bill chain network may maintain a service logic of an electronic bill in a full life cycle through the bill chain, for example, may manage full life cycles of all issued electronic bills through the bill chain. For example, the full life cycle of the electronic bill herein includes issuing of the electronic bill, circulation of the electronic bill, and reimbursement of the electronic bill. It is to be understood that in the blockchain network corresponding to the overall service, the bill chain maintained by the first consensus node features high performance and a low delay.

Similarly, for ease of understanding, an example in which a core consensus network including the application contract chain (that is, the application contract chain network) is the consensus network 300*a* shown in FIG. 1 is used herein. In this case, the consensus node participating in maintaining the application contract chain may be the foregoing second consensus node. As shown in FIG. 2, a plurality of smart contracts are deployed on the application contract chain, and these smart contracts may run on the second consensus node. Specifically, it may be understood that the plurality of smart contracts herein may specifically include a virtual machine compatible contract, an open contract deployment contract, a derivative service contract, and a second cross-chain reading contract shown in FIG. 2.

It may be understood that the second consensus node deployed in the application contract chain network may bear a variable derivative service corresponding to the bill service through the application contract chain. For example, the derivative service herein may specifically include the foregoing credit service and the foregoing qualification recognition service. It is to be understood that in the blockchain network corresponding to the overall service, the application contract chain maintained by the second consensus node may support a government affairs cooperation department and a consortium blockchain partner (that is, a service associated department shown in FIG. 2) shown in FIG. 2 to indirectly invoke the second cross-chain reading contract through a tax application contract shown in FIG. 2 (the open contract deployment contract), to develop, by using the application contract template read in the cross-chain manner from the management chain, a smart contract (for example, the derivative service contract shown in FIG. 2) related to the derivative service, and the derivative service contract may be deployed on the application contract chain after auditing by the tax management department. It is to be understood that the smart contract deployed on the application contract chain may be flexibly upgraded and changed through the virtual machine compatible contract. It is to be understood that in the blockchain network corresponding to the overall service, the second consensus node may implement cross-chain interaction through the second cross-chain reading contract on the application contract chain, for example, may read the core data from the bill chain through the second cross-chain reading contract to perform the derivative service. This means that compared with the management chain and the bill chain, the application contract chain maintained by the first consensus node is open to a maximum extent, supports a complex smart contract logic, involves more participants that keep dynamically change, and has lower performance than the bill chain.

It may be understood that in the blockchain electronic bill three-chain network shown in FIG. 2, a consensus algorithm used for the management chain is different from that used for the bill chain and that used for the application contract chain.

Specifically, (1.1) the consensus algorithm associated with the management chain is an instant finality consensus algorithm. For example, the instant finality consensus algorithm herein may be a practical byzantine fault tolerance (PBFT) consensus algorithm. A status of a specific to-be-uploaded proposed block may be instantly determined through the PBFT consensus algorithm. It is to be understood that the management chain is one blockchain in the foregoing management chain network. The tax management department shown in FIG. 2 may participate in managing a consensus node (that is, the foregoing management consensus node) in the management chain network.

It is to be understood that the internal participant associated with the management chain may be the tax management department shown in FIG. 2. For example, when the tax management department accesses the management chain as the internal participant, some internal statuses of the tax management department may be managed through the internal management contract on the management chain. For example, the staff in the tax management department may be managed. For example, specific tax management staff, tax development staff, tax auditing staff, and the like may be selected from the staff of the tax management department. In addition, when the tax management department accesses the management chain as the internal participant, some parameters in the three-chain system may be managed through the internal management contract on the management chain. For example, an access traffic parameter corresponding to the access traffic at the bill chain entry shown in FIG. 2 may be limited through the internal management contract. For example, the access traffic at the bill chain entry in some specific time periods is controlled to be not greater than an access traffic threshold through a time division access mechanism. For another example, when the tax management department accesses the management chain as the internal participant, a node quantity parameter corresponding to a quantity of consensus nodes participating in consensus on each chain may be limited through the internal management contract on the management chain.

(1.2) The consensus algorithm associated with the bill chain is another instant finality consensus algorithm. For example, the instant finality consensus algorithm herein may be a tower byzantine fault tolerance (TBFT) consensus algorithm. The TBFT consensus algorithm is a byzantine fault tolerance algorithm, and can ensure secure running of the entire bill chain network system when a quantity of byzantine nodes (that is, a quantity of malicious nodes in the bill chain network) is less than ⅓ of a total quantity of nodes of the bill chain network. It is to be understood that the foregoing tax management department may participate in managing the consensus node in the bill chain network. For example, specific tax staff in the tax management department may control the quantity of consensus nodes in the bill chain network through the internal management contract in the management chain. For another example, tax bureau terminals corresponding to specific tax staff in the tax management department may participate in forming the bill chain network.

It is to be understood that the biggest difference between the TBFT consensus algorithm and the PBFT consensus algorithm lies in that the PBFT consensus algorithm has a fixed leader node (that is, master node) for packing a transaction in the transaction pool, and the leader node may be changed based on a view-change sub-protocol (that is, a master node switching sub-protocol) when the leader node is faulty. In the TBFT consensus algorithm, the leader node rotates based on a rotation mechanism. For example, when a current node is used as the leader node, the leader node may automatically rotate to a next node every time when X blocks are submitted (a value of X may be configured). This means that the consensus nodes in the bill chain network corresponding to the bill chain may be configured for continuous block proposal.

(1.3) The consensus algorithm associated with the application contract chain is still another instant finality consensus algorithm. For example, the instant finality consensus algorithm herein may be a proof-of-stack (PoS) consensus algorithm. The PoS consensus algorithm can ensure network security of the application contract chain network including the application contract chain. A status of a specific to-be-uploaded proposed block may be instantly determined through the PoS consensus algorithm. It may be understood that the tax management department and the government affairs cooperation department shown in FIG. 2, a large-scale participant organization (that is, a large-scale enterprise in the foregoing consortium blockchain, which is the service associated department shown in FIG. 2), and the like participate in managing the consensus node in the application contract chain network. For example, tax staff in the tax management department (for example, a tax service participant shown in FIG. 2) may read, through the consensus node in the application contract chain network in the cross-chain manner, bill information of the electronic bill written to the bill chain, to perform, based on the bill information read in the cross-chain manner, the derivative service associated with the bill service. For example, qualification recognition or credit recognition may be performed on a billing enterprise requesting for billing based on the bill information read in the cross-chain manner, to obtain qualification data or credit data of the billing enterprise. It is to be understood that as shown in FIG. 2, when the tax service participant herein accesses the application contract chain network through the application contract chain entry shown in FIG. 2, the second cross-chain reading contract on the application contract chain shown in FIG. 2 may be invoked to read the core data in the electronic bill requested based on the derivative service from the bill chain shown in FIG. 2, to develop the corresponding derivative service on the application contract chain by using the read core data.

It is to be understood that in the embodiments of this disclosure, it is unnecessary to directly transfer a large quantity of electronic bills generated on the bill chain to the application contract chain in the cross-chain manner, and instead, some bill information that is visible to the authorized (that is, the foregoing core data) in these electronic bills generated on the bill chain is transferred to the application contract chain in the cross-chain manner. In this way, privacy and security of these electronic bills recorded on the bill chain can be ensured from the source.

Thus, it can be seen that the tax service participant requesting to access the foregoing application contract chain may read different core data from the bill chain in the cross-chain manner based on different derivative services that are requested (that is, may obtain bill information with different data content from the electronic bill).

It is to be understood that the smart contracts in the blockchain electronic bill three-chain network have the following differences.

(2.1) It is to be understood that the management chain shown in FIG. 2 may support a specific-language smart contract engine. The management consensus node may deploy a specific-language smart contract on the management chain through the specific-language smart contract engine, for example, may deploy the object permission management contract, the object identity management contract, the metadata management contract, the internal management contract, and the like shown in FIG. 2. It is to be understood that these smart contracts may be developed and managed by specific tax management staff in the tax management department.

(2.2) There are built-in smart contracts with specific bill service logics on the bill chain shown in FIG. 2. These smart contracts (for example, the electronic bill issuing contract, the electronic bill circulation contract, the electronic bill reversal contract, the electronic bill archiving contract, and the first cross-chain reading contract shown in FIG. 2) may be upgraded with an update of the bill service. For example, in the embodiments of this disclosure, the bill service logic in the electronic bill issuing contract may be updated based on metadata information read from the management chain, and the bill service may be further updated and processed based on the updated electronic bill issuing contract. This means that the bill chain does not support an independent smart contract engine, and thus does not support deployment of another contract unrelated to the bill service on the bill chain. In this way, the bill chain runs only a service logic related to an electronic bill without influence of other smart contracts. Therefore, the bill chain can run more independently and stably, and is more resistant to attacks.

(2.3) The application contract chain supports multi-language, Turing-complete and developer-oriented smart contracts. For example, as shown in FIG. 2, when the developer accesses the application contract chain through the application contract chain entry, compatibility with a mainstream Ethereum virtual machine (EVM) may be achieved through the virtual machine compatible contract, so that various new service contracts may be deployed for running on the compatible virtual machine. For example, a derivative service contract associated with the derivative service (for example, the foregoing lottery service) may be deployed on the application contract chain. For another example, a derivative application contract associated with another derivative service (for example, the foregoing tax rebating service) may be deployed on the application contract chain.

It is to be understood that as shown in FIG. 2, in the blockchain electronic bill three-chain network, the management chain is deployed with no cross-chain reading contract, and thus does not have a cross-chain capability at this point. The bill chain and the application contract chain shown in FIG. 2 are deployed with cross-chain reading contracts, and thus have the cross-chain capability.

Specifically, a consensus node (for example, the foregoing first consensus node) associated with the bill chain may read some management chain information from the management chain through the first cross-chain reading contract shown in FIG. 2. For example, registration data information of an authorized object for storage in the bill chain entry may be read from the management chain. For another example, first service associated information for confirming a service permission of the first service object may be read from the management chain, and key bill information for issuing an electronic bill (for example, an electronic invoice) may be further read from the management chain.

The key bill information herein is auxiliary metadata information (for example, an updated electronic bill template recorded on the management chain) that is read from the management chain based on the electronic bill service in the bill service and that is visible to the authorized when it is determined that the service permission is of a billing permission type.

In addition, a consensus node (for example, the foregoing second consensus node) associated with the application contract chain may read some management chain information from the management chain through the second cross-chain reading contract shown in FIG. 2. For example, a service participation license of the authorized object (authorized nodes) for storage at the application contract chain entry shown in FIG. 2 may be read from the management chain. Second service associated information for performing service authentication on a service object that requests to perform the derivative service may also be read from the management chain. Some bill information may be further read from the bill chain (for example, some bill information that is visible to the authorized in the electronic bill associated with the derivative service is read from the bill chain). It is to be understood that some management chain information and some bill chain information read by the second consensus node from the management chain may be used for developing the foregoing derivative service.

It is to be understood that as shown in FIG. 2, in the blockchain electronic bill three-chain network, a public network participant associated with the management chain may be an individual user and an enterprise user shown in FIG. 2. Similarly, as shown in FIG. 2, a public network participant associated with the bill chain may be each local electronic bill data flow system shown in FIG. 2. Each local electronic bill data flow system herein specifically includes each local electronic bill service issuing system (for example, each local tax bureau system), an electronic bill issuing service provider, a tax related system of a large-scale enterprise, and the like. Similarly, as shown in FIG. 2, a public network participant associated with the application contract chain may be the tax service participant and the developer shown in FIG. 2.

Specifically, (3.1) a chain entry associated with the management chain may be the management chain entry shown in FIG. 2. When the individual user (for example, a user A) and the enterprise user (for example, an enterprise B) shown in FIG. 2 and the like are public network participants, the management chain may be accessed through the management chain entry, and identity registration, identity authorization, and other services may be further performed through the management chain. (3.2) A chain entry associated with the bill chain may be the bill chain entry shown in FIG. 2. When each local electronic bill data flow system (for example, a large-scale enterprise user) shown in FIG. 2 and the like are public network participants, the bill chain may be accessed through the bill chain entry, and the electronic bill issuing service, the electronic bill circulation service, the electronic bill reversal service, and the electronic bill archiving service may be further performed through the bill chain. (3.3) A chain entry associated with the application contract chain may be the application contract chain entry shown in FIG. 2. When the tax service participant and the development shown in FIG. 2 and the like are public network participants, the application contract chain may be accessed through the application contract chain entry, and the derivative service contract may be further deployed on the application contract chain to perform the derivative service related to an electronic bill through the deployed derivative service contract. It is to be understood that the developer shown in FIG. 2 may further deploy a derivative service contract corresponding to another derivative service (or a discovery service) on the application contract chain when accessing the application contract chain. A quantity of derivative service contracts deployed on the application contract chain is not limited herein.

It may be understood that the management chain entry shown in FIG. 2 may be specifically a tax management department entry. Through the tax management department entry, identity recognition and service guidance may be performed on an individual, a legal person, an entity, and the like that need to access the management chain.

It may be understood that the bill chain entry shown in FIG. 2 may be specifically an electronic bill service entry. Transaction service data (which may be also referred to as transaction data) of an electronic bill requested by a specific service object (for example, the first service object, which may be the foregoing enterprise B) to be issued may be received through the electronic bill service entry. In this way, when the first consensus node receives the transaction service data submitted by the enterprise B through the electronic bill service entry, whether an access identity and an access permission of a data transmitter (that is, the enterprise B used as the first service object) of the transaction service data meet a status requirement of an identity permission contract in the management chain may be further verified through the electronic bill service entry. When verification succeeds, the enterprise B used as the first service object is determined as the authorized object. Further, the first service associated information may be read from the management chain through the first cross-chain reading contract on the bill chain, to determine a service permission of the enterprise B determined as the authorized object. It is to be understood that whether the service permission of the enterprise B determined as the authorized object meets a status requirement of the object permission management contract in the management chain may be further determined based on the first service associated information.

For example, the first consensus node may determine, through the electronic bill service entry, whether the access identity and the access permission of the data transmitter (that is, the enterprise B) meet contract status requirements of the object identity management contract and the internal management contract in the management chain. Further, when it is determined that the contract status requirements of the object identity management contract and the internal management contract in the management chain are met, it is determined that identity authentication of the data transmitter (that is, the foregoing enterprise B) that needs to access the bill chain is completed. Thus, it can be seen that the bill chain entry shown in FIG. 2 stores registration data information of each authorized object (authorized objects) synchronized from the management chain. The registration data information herein may include but is not limited to object access identity registration information and object access permission registration information. For example, the object access identity registration information herein may be used for recognizing whether the first service object (that is, the foregoing enterprise B) currently requesting to access the bill chain is an authorized object. The object access permission registration information herein includes a cumulative request threshold (for example, a maximum cumulative concurrent request quantity) configured by the management consensus node for the electronic bill service entry of the bill chain through the internal management contract. The first service associated information may be used for characterizing specific bill service contracts on the bill chain to which the first service object (that is, the foregoing enterprise B) determined as the authorized object has a permission to access.

It may be understood that the application contract chain entry shown in FIG. 2 may be specifically a tax derivative service entry. A derivative service that is requested by a specific service object (for example, a second service object, which may be the tax service participant shown in FIG. 2) to participate in and that is associated with the bill service may be received through the tax derivative service entry. It is to be understood that after obtaining the service participation license of the authorized object issued by the tax management department, the tax service participant and the developer shown in FIG. 2 may verify, through the application contract chain entry, the service participation license submitted by the second service object (for example, the tax service participant or the developer), and when verification succeeds, may further allow the second service object to access the application contract chain, to perform the derivative service associated with the bill service on the application contract chain.

As shown in FIG. 2, the internal participant that participates in maintaining the management chain may be the tax management department shown in FIG. 2. The tax management department herein is mainly configured to configure and manage an internal status parameter on the management chain, may be further configured to change and upload the foregoing metadata information (for example, tax metadata) (for example, may update the electronic bill template and update a tax calculation rule), and may manage identities and permissions of various service participants maintained on the management chain (for example, freeze a billing qualification of an enterprise and limit a billing amount of the enterprise).

As shown in FIG. 2, the internal participant that participates in maintaining the bill chain may be the electronic bill data center shown in FIG. 2. The electronic bill data center herein may be specifically an electronic invoice data center. The electronic bill data center (for example, the electronic invoice data center) may be configured to perform off-chain backup, statistics, data analysis, auditing, and other work on massive ledger data (for example, an electronic bill flow generated based on the foregoing real-time bill service flow) recorded on the bill chain. Specifically, a time division billing quantity may be statistically obtained through the electronic bill data center. Further, a risk bill (for example, a risk invoice) and a risk enterprise may be determined based on the statistically obtained time division billing quantity. Data analysis and the like may be further performed on related financial economic data.

As shown in FIG. 2, the internal participant that participates in maintaining the application contract chain may be the government affairs cooperation department and the service associated department shown in FIG. 2. It is to be understood that another participant (that is, the foregoing government affairs cooperation department) and participant (that is, the foregoing service associated department) in the system consortium blockchain in the internal participants that participate in maintaining the application contract chain other than the tax management department may further perform the corresponding derivative service through the derivative service contract on the application contract chain when accessing the application contract chain. It may be understood that as tax service participants, access of the government affairs cooperation department and the service associated department shown in FIG. 2 to the application contract chain has advantages that flexible running of various extensible derivative services in a complete smart contract life cycle may be supported to ensure service change flexibility. In addition, direct contact with the core data of the electronic bill on the bill chain is not required, so that privacy of the data and security of the core data on the bill chain are ensured. This means that the second consensus node involved in the embodiments of this disclosure may read some bill chain data of the current derivative service that is visible to the authorized on the bill chain through the second cross-chain reading contract (specifically, through a cross-chain reading method in the second cross-chain reading contract) on the application contract chain. For example, the core data (the core data herein may be the bill information in each electronic bill involved in the foregoing electronic bill flow, and when the electronic bill is an electronic invoice, the bill data herein may be specifically some invoice data that is visible to the authorized) related to the current derivative service may be read from the bill chain, to ensure, through the read core data, that the derivative service requested by the second service object may be effectively developed on the application contract chain.

In some other possible embodiments, to improve the data privacy of the electronic bill on the bill chain, the second consensus node may further request, through a target chain identifier (for example, the target chain identifier herein is a chain identifier corresponding to the bill chain) indicated by a cross-chain authorization method in the second cross-chain reading contract, the first consensus node corresponding to the bill chain to read the electronic bill associated with the derivative service (for example, an electronic bill issued by an enterprise C) from the bill chain. Further, the bill information associated with the derivative service in the read bill information of the electronic bill may be returned to the second consensus node as the foregoing core data that is visible to the authorized. It is to be understood that in this case, the second consensus node cannot obtain other bill information of the electronic bill unrelated to the derivative service and touch another electronic bill (that is, an electronic bill issued by an enterprise D) unrelated to the derivative service on the bill chain. In this way, privacy security and reliability of the bill data stored on the bill chain can be ensured.

It may be understood that there are built-in corresponding smart contracts in the blockchain electronic bill three-chain network shown in FIG. 2.

(4.1) For the built-in smart contract on the management chain, as shown in FIG. 2, the built-in object identity management contract on the management chain may be specifically a user management contract. Identities of an access party (for example, the public network participant) and the participant (for example, the internal participant) in the entire three-chain system may be managed through the user management contract. It is to be understood that the access party and the participant herein may specifically include the tax management staff (manager for short), the government affairs cooperation department, a local tax bureau, a billing service provider, a reimbursement service provider, and a tax examination department. In addition, the built-in object permission management contract on the management chain may be specifically an enterprise identity management contract. Service permissions and tax statuses of some enterprises may be managed through the enterprise identity management contract. Similarly, the built-in metadata management contract on the management chain may be specifically a tax metadata management contract. A tax rule and other metadata information may be managed through the tax metadata management contract. For example, a contract module, a tax calculation logic, and a latest policy rule under the three-chain system may be managed in a centralized manner. By analogy, the built-in internal management contract on the management chain may be used for managing some internal statuses of the tax management department, and managing some internal parameters on each chain in the three-chain system. For example, the access traffic parameter at the bill chain entry (for example, the electronic invoice service entry) and a quantity of consensus nodes in the three-chain system may be limited through the internal management contract.

(4.2) For the built-in smart contact on the bill chain, as shown in FIG. 2, the built-in smart contract on the bill chain may include a cross-chain reading contract and a bill service contract associated with the life cycle of the electronic bill. The cross-chain reading contract herein may be the first cross-chain reading contract shown in FIG. 2. The bill service contract herein may specifically include the electronic bill issuing contract for providing the electronic bill issuing service, the electronic bill circulation contract for providing the electronic bill circulation service, the electronic bill reversal contract for providing the electronic bill reversal service, and the electronic bill archiving contract for providing the electronic bill archiving service in FIG. 2. The first cross-chain reading contract may be used for reading the metadata information on the management chain in the cross-chain manner, to update some service parameters on the bill chain. For example, specifically, when the metadata read in the cross-chain manner is the updated electronic bill template, the template parameter of the electronic bill template on the bill chain may be updated. Thus, it can be seen that the first consensus node running the first cross-chain reading contract and the second consensus node running the second cross-chain reading contract are authorized to read some management chain information on the management chain (for example, metadata information on the management chain).

(4.3) For the built-in smart contract on the application contract chain, as shown in FIG. 2, the built-in smart contract on the bill chain may include another cross-chain reading contract (that is, the second cross-chain reading contract), and may further include various contracts (for example, the virtual machine compatible contract, the tax application contract, and the derivative service contract shown in FIG. 2) that the tax derivative service participant (that is, the derivative service object, for example, the tax service participant shown in FIG. 2) participates in deploying. For example, the derivative service contract herein may be specifically an electronic-bill-based credit service contract. Credit data of a specific enterprise may be analytically obtained through the credit service contract. For another example, the derivative service contract herein may also be specifically an on-chain lottery service contract, a talent motivation contract, a tax rebating service contract, and the like deployed to inspire billing. It may be understood that the second cross-chain reading contract herein may be used for reading the metadata information (for example, the latest policy rule associated with the tax rebating service) on the management chain in the cross-chain manner, to update some service parameters of the application contract chain (for example, a contract parameter of the tax rebating service contract deployed on the application contract chain may be updated). In addition, the second cross-chain reading contract herein may be further used for reading some bill information that is visible to the authorized on the bill chain in the cross-chain manner, to perform the logic service of the derivative service on the application contract chain and the like based on some bill information that is read in the cross-chain manner and that is visible to the authorized.

It is to be understood that the management chain shown in FIG. 2 is mainly used for processing a managerial service flow whose data volume is small and status is constant. The entire management chain is not so open, and may be used for performing internal management on some tax data. The bill chain shown in FIG. 2 may be used for processing some real-time bill service flows that are in a high-frequency request state for a long time. The entire bill chain is highly open, and may allow a related authority in the life cycle of the electronic bill to participate in the corresponding bill service, for example, may allow a consensus node corresponding to a proxy service provider to issue an electronic bill for a specific user currently requesting for billing. In addition, for the application contract chain shown in FIG. 2, a data volume may not need to be limited, and a service change frequency fluctuates greatly. Various cooperation services, derivative services, discovery services, and the like may be mainly processed through the application contract chain. It is to be understood that the application contract chain is the most open. On the application contract chain, a participant authorized by the management chain may deploy a smart contract, run a discovery derivative service, and the like. It is to be understood that in the embodiments of this disclosure, considering high openness and service change flexibility of the application contract chain, there may be more contract security limitations when the built-in smart contract on the application contract chain is performed. For example, a quantity of steps for performing the contract may be limited (for example, for the derivative service contract shown in FIG. 2, a current service object (that is, the foregoing second service object) may be limited to access a specific contract method in the derivative service contract), and storage resource data to access the derivative service contract and the like may be limited (that is, a specific amount of storage resource data used to invoke the smart contract on the application contract chain).

It may be understood that the consensus node in the three-chain system involved in the embodiments of this disclosure may be an independent physical server, a server cluster or distributed system including a plurality of physical servers, or a cloud server providing a basic cloud computing service, for example, a cloud service, a cloud database, cloud computing, a cloud function, cloud storage, a network service, cloud communication, a middleware service, a domain name service, a security service, or a big data and artificial intelligence platform.

When the consensus node in the embodiments of this disclosure obtains the registration data information of the service object (for example, the foregoing individual user or enterprise user), the service participation license, the bill information in the electronic bill, and other data in the cross-chain manner, a prompt interface or a pop-up window may be displayed. The prompt interface or the pop-up window is used for prompting the service object that the registration data information, the service participation license, the bill information in the electronic bill, and the other data are currently collected. A step related to data obtaining starts to be performed only after it is learned that the service object performs a confirmation operation on the prompt interface or the pop-up window, otherwise the process is ended.

In addition, it may be understood that a specific implementation of this disclosure may relate to service data of a service object such as a user, an enterprise, and an organization (for example, billing information, credit information, and tax rebating information of the user, or information about import and export and an enterprise qualification of the enterprise). When the foregoing embodiments of this disclosure are applied to a specific product or technology, a license or consent of the service object such as the user, the enterprise, or the organization is to be obtained, and collection, use, and processing of the related data comply with related laws and regulations and standards of related countries and regions.

For a specific process of performing the bill service on the bill chain and a specific process of performing the derivative service associated with the bill service on the application contract chain, refer to the following embodiments corresponding to FIG. 3 to FIG. 8.

Figure 3:
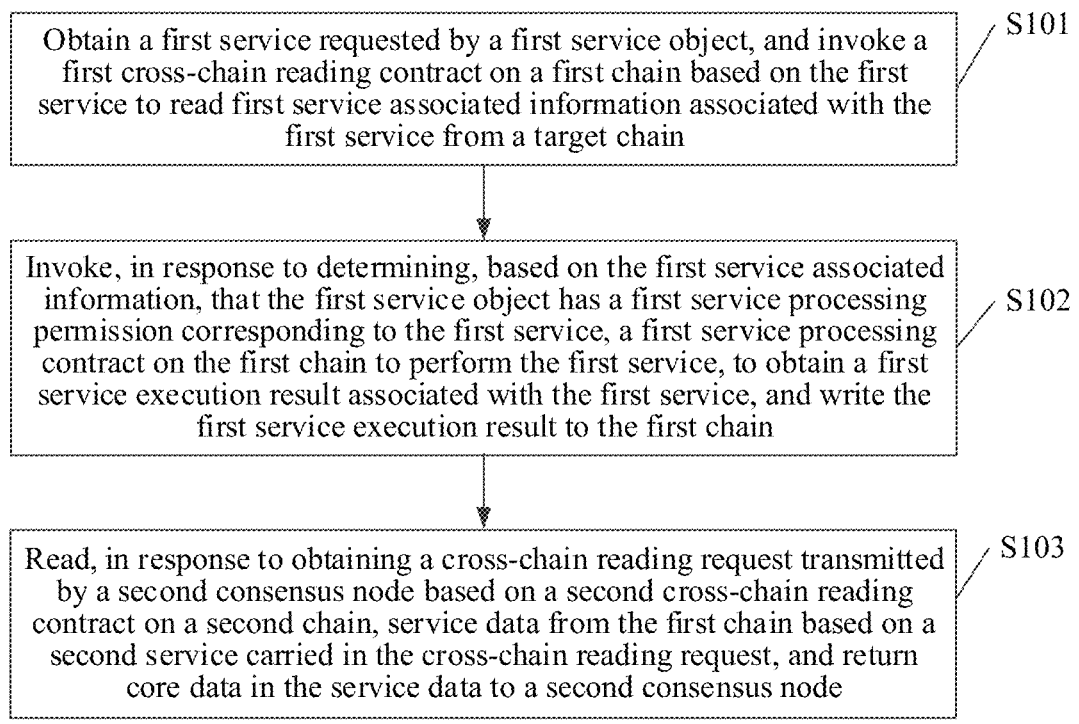
FIG. 3 shows a multi-blockchain data processing method according to an embodiment of this disclosure.

Further, refer to FIG. 3. FIG. 3 shows a multi-blockchain data processing method according to an embodiment of this disclosure. As shown in FIG. 3, the method may be performed by the first consensus node in the foregoing first chain network. For example, the first consensus node may be any consensus node in the consensus network 200a shown in FIG. 1. The method may specifically include the following step S101 to step S103.

Step S101: Obtain a first service requested by a first service object, and invoke a first cross-chain reading contract on a first chain based on the first service to read first service associated information associated with the first service from a target chain, the first chain being a blockchain in the first chain network, the target chain being a blockchain in a target chain network, the target chain network being independent of the first chain network, and the first chain being different from the target chain. For example, a first service request is received from a first service node, and a first cross-chain reading contract on a first chain is invoked to read first service associated information from a target chain. The first chain is a blockchain in a first chain network, the target chain being a blockchain in a target chain network independent of the first chain network.

It may be understood that the first chain network involved in this embodiment of this disclosure is one consensus network in the foregoing blockchain electronic bill three-chain network. In addition, it may be understood that in this embodiment of this disclosure, the first chain network is deployed in a secure private cloud, and a blockchain consensus protocol based on the foregoing TBFT consensus algorithm runs on each consensus node in the first chain network in the private cloud. Therefore, a consensus mechanism corresponding to the foregoing blockchain consensus protocol can ensure access security between the consensus nodes in the first chain network.

However, if a public network participant in a public network (for example, a service object like the individual user and the enterprise user shown in FIG. 2) needs to access the first chain network, identity verification and permission verification need to be first performed, through the first chain entry shown in FIG. 2, on the public network participant requesting to access the first chain network, to ensure access security of the public network participant accessing the first chain network.

For ease of understanding, in this embodiment of this disclosure, the public network participant requesting to access the first chain network is collectively referred to as the first service object. Further, identity authentication may be performed on the first service object through the foregoing first chain entry.

It may be understood that in this embodiment of this disclosure, a chain entry corresponding to the first chain network may be the foregoing first chain entry (the first chain entry herein may also be specifically an electronic invoice service entry). The first chain entry stores registration data information of an authorized object registered by the first consensus node from the target chain through the first cross-chain reading contract at a first cross-chain reading timestamp.

Specifically, the first consensus node may obtain, through the first chain entry of the first chain network, a first service processing request transmitted by a first service node corresponding to the first service object based on the first service. The first service processing request carries transaction service data submitted by the first service object for the first service and first signature information of the first service object. The first signature information is obtained after the first service node associated with the first service object signs the transaction service data based on first private key information of the first service object. The first private key information of the first service object is obtained after the first service object performs identity registration through an object identity management contract in the target chain. Further, the first consensus node may obtain the first signature information from the first service processing request, and perform signature verification on the first signature information based on the registration data information of the authorized object stored in the first chain entry, to obtain a signature verification result of the first service object. Further, the first consensus node may determine, in a case that the signature verification result of the first service object indicates that signature verification succeeds, that the first service object is the authorized object, and determine, based on the transaction service data, the first service associated with the first service object. Further, the first consensus node may invoke the first cross-chain reading contract based on the first service to read the first service associated information associated with the first service from the target chain. It is to be understood that the first service herein may include but is not limited to a bill service associated with an electronic bill, a certificate service associated with an electronic certificate, and a prescription service associated with an electronic prescription. To be specific, in this embodiment of this disclosure, three-chain systems adapted to different service scenarios may be constructed based on different service application scenarios. For ease of understanding, an example in which the first service is a bill service associated with an electronic bill is used to describe a specific process of performing the bill service in the first chain network.

Figure 4:
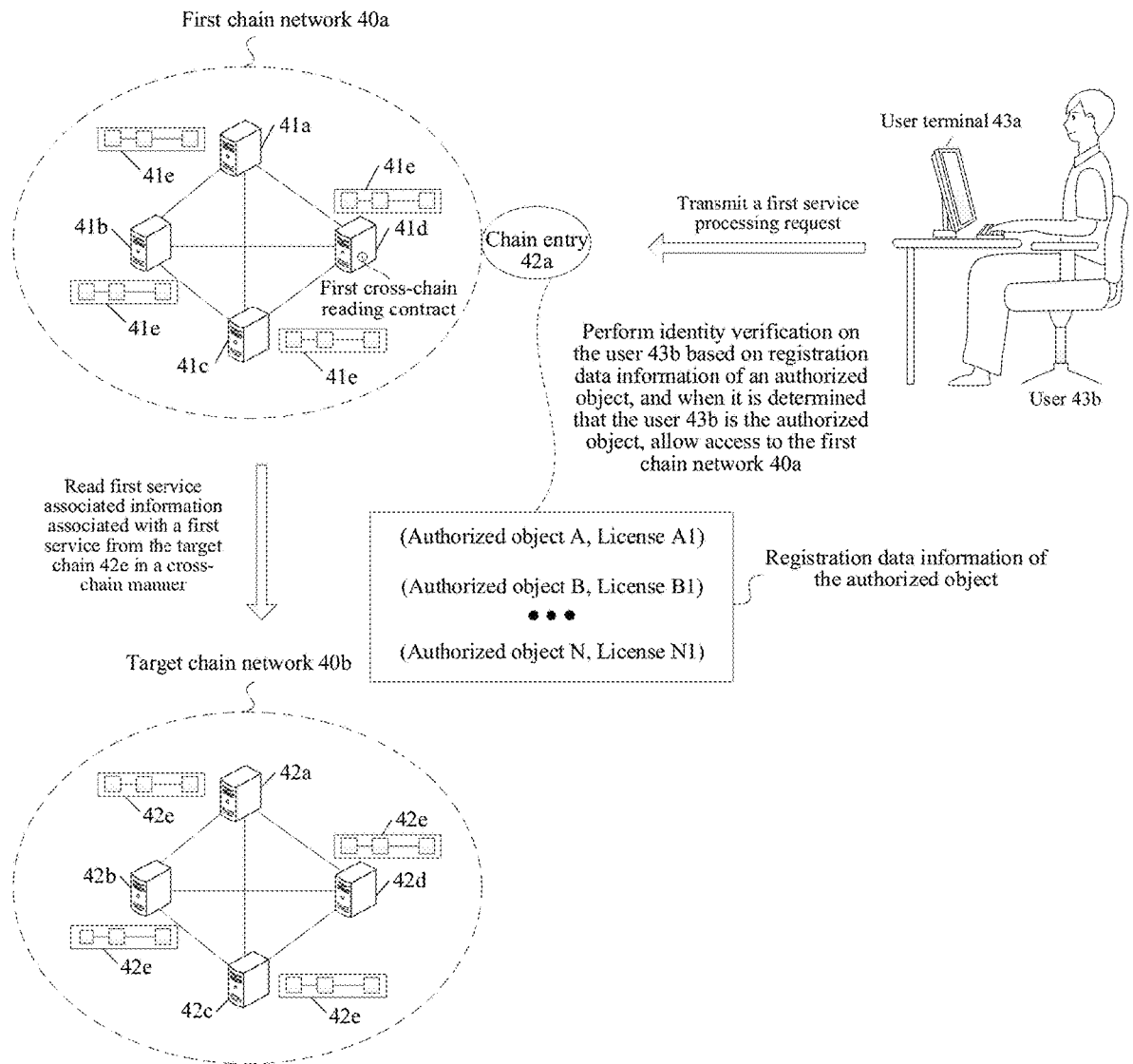
FIG. 4 is a schematic diagram of a scenario in which identity authentication is performed through a chain entry according to an embodiment of this disclosure.

For ease of understanding, further, refer to FIG. 4. FIG. 4 is a schematic diagram of a scenario in which identity authentication is performed through a chain entry according to an embodiment of this disclosure. A user 43b in FIG. 4 may be the foregoing first service object. To be specific, in this case, the user 43b is the public network participant requesting to access a first chain network 40a. It is to be understood that in this embodiment of this disclosure, a user terminal 43a used by the user 43b may be the first service node corresponding to the first service object. It is to be understood that the first service node herein may be a service node in the service network 400a shown in FIG. 1. In this case, the first service node herein may be configured to perform a specific transaction (for example, a transfer transaction), to obtain transaction service data corresponding to this transfer transaction, and may further add the transaction service data and signature information of the user 43a (that is, the first service object) to the first service processing request shown in FIG. 4, to transmit the first service processing request to a chain entry 42a corresponding to the first chain network 40a shown in FIG. 4.

It is to be understood that the chain entry 42a herein is the foregoing first chain entry. As shown in FIG. 4, the first chain entry may be used for storing the registration data information of the authorized object shown in FIG. 4. The registration data information of the authorized object may specifically include a public key certificate A1 of an authorized object A, a public key certificate B1 of an authorized object B, . . . , and a public key certificate N1 of an authorized object N shown in FIG. 4.

It is to be understood that the registration data information of the authorized object stored in the chain entry 42a is synchronized (registered) by the consensus node in the first chain network 40a from a target chain 42e shown in FIG. 4. The foregoing TBFT consensus algorithm is run on the consensus node in the first chain network. Therefore, in the TBFT consensus algorithm, on the premise of alternation of a leader node, if a leader node for continuous block proposal of a previous round is a consensus node 41c shown in FIG. 4, and a leader node for continuous block proposal of a current round, is a consensus node 41d shown in FIG. 4, the consensus node 41c may be used as the first consensus node in the previous round, and the consensus node 41d may be used as a new first consensus node in the current round. Based on this, the registration data information of the authorized object stored in the chain entry 42a may specifically include registration data information of a first-type authorized object (for example, the public key certificate A1 of the authorized object A and the public key certificate B1 of the authorized object B) synchronized by the consensus node 41c serving as a historical first consensus node from the target chain (for example, the target chain 42e shown in FIG. 4) through the first cross-chain reading contract shown in FIG. 4 and registration data information of a second-type authorized object (for example, the public key certificate N1 of the authorized object N) synchronized by the consensus node 41d serving as a current first consensus node from the target chain (for example, the target chain 42e shown in FIG. 4) through the first cross-chain reading contract shown in FIG. 4. It is to be understood that the registration data information of the first-type authorized object and the registration data information of the second-type authorized object herein are mainly used for distinguishing between registration data information synchronized by the current consensus node as the first consensus node and registration data information synchronized by another node as the first consensus node.

It is to be understood that in this embodiment of this disclosure, a timestamp at which the consensus node in the first chain network 40a (for example, the foregoing consensus node 41c and consensus node 41d) historically invokes the first cross-chain reading contract is collectively referred to as the first cross-chain reading timestamp, and a timestamp at which the consensus node in the first chain network 40a (for example, the consensus node 41d) currently invokes the first cross-chain reading contract is collectively referred to as a second cross-chain reading timestamp. To be specific, the second cross-chain reading timestamp herein is a timestamp after the first cross-chain reading timestamp. A timestamp interval between the second cross-chain reading timestamp and the first cross-chain reading timestamp is not limited herein.

For ease of understanding, an example in which the consensus node 41d is used as the first consensus node is used herein to describe a specific process of performing identity authentication on the user 43b. To be specific, the first consensus node may specifically add, to the registration data information of the authorized object shown in FIG. 4, the public key certificate N1 of the authorized object N synchronized from the target chain (for example, the target chain 42e) at the first cross-chain reading timestamp by using an identity authentication method in the first cross-chain reading contract, to subsequently quickly perform, based on the registration data information of the authorized object locally stored in the chain entry 42a, identity authentication on the first service object currently requesting to perform the first service. Therefore, efficiency of processing a real-time service flow may be improved in the first chain network 40a.

For example, the blockchain system is applied to a blockchain electronic bill scenario. When the first service is the foregoing bill service, the real-time service flow herein may be specifically a real-time electronic bill flow. To be specific, the real-time electronic bill flow may be specifically a bill service flow including a large quantity of bill services that are determined by the first consensus node through the foregoing first chain entry (for example, the chain entry 42a) and that are in the high-frequency request state.

It is to be understood that the first chain entry (for example, the chain entry 42a) involved in this embodiment of this disclosure further stores a cumulative request threshold synchronized from the target chain (the cumulative request threshold is used for characterizing access traffic at the first chain entry, and it is to be understood that the cumulative request threshold herein includes but is not limited to a maximum cumulative concurrent request quantity). It is to be understood that the maximum cumulative concurrent request quantity of the first service processing request obtained by the chain entry 42a is specifically determined by an internal management contract run on a management consensus node in a target chain network 40b. It is to be understood that in this embodiment of this disclosure, the internal management contract run on a target consensus node (for example, a consensus node 42a shown in FIG. 4) may be used for managing a maximum cumulative concurrent request quantity obtained from each chain entry in the three-chain system. It is to be understood that controlling concurrent access traffic (that is, the foregoing maximum cumulative concurrent request quantity) at each chain entry can effectively ensure stable execution of a first service flow in the first chain network 40a, to further ensure that the first consensus node has sufficient storage resources to store a service data flow including a large amount of service data.

For ease of understanding, in this embodiment of this disclosure, signature information of the user 43a (that is, the first service object) is collectively referred to as the first signature information. The first signature information is obtained after the by the user 43a (that is, the first service object) signs the foregoing transaction service data based on private key information of the user 43a (that is, the first private key information of the first service object). In this way, when the chain entry 42a shown in FIG. 4 obtains the first service processing request, a cumulative request quantity corresponding to the first service processing request may be statistically obtained. Further, when the cumulative request quantity corresponding to the first service processing request does not reach the cumulative request threshold (for example, the foregoing maximum cumulative concurrent request quantity), access permission verification (also referred to as access permission verification) on the user 43b is preliminarily completed. In this case, the first consensus node may further obtain the first signature information of the first service object from the first service processing request, and may further quickly obtain a public key certificate of the authorized object (for example, the public key certificate A1 of the authorized object A, the public key certificate B1 of the authorized object B, . . . , and the public key certificate N1 of the authorized object N shown in FIG. 4) from the registration data information of the authorized object stored in the chain entry 42a, to perform identity verification on the user 43b by using the obtained public key certificate. It is to be understood that in this embodiment of this disclosure, when the cumulative request quantity corresponding to the first service processing request reaches the cumulative request threshold (for example, the foregoing maximum cumulative concurrent request quantity), the first service processing request transmitted by the user 43b is directly rejected, and a notification message for prompting the user 43b to wait for access is generated.

It is to be understood that the public key certificate of each authorized object includes public key information of the corresponding authorized object. Therefore, the first consensus node may further search, in the public key certificates of these authorized objects, for a public key certificate of the user 43b. (1) If there is the public key certificate of the user 43b, the public key certificate of the user 43b may be used as the found first public key certificate of the first service object, and may further determine public key information of the user 43b recorded in the first public key certificate as the first public key information, to perform signature verification on the foregoing first signature information based on the first public key certificate and the first public key information, to obtain the signature verification result of the first service object. (2) If there is not the public key certificate of the user 43b, that is, the first consensus node does not search, in the public key certificates of these authorized objects, for the public key certificate of the user 43b, it is confirmed that the user 43b (that is, the first service object) is an illegal service object (illegal service node), and the first service processing request transmitted by the user 43b determined as the illegal service object may be further rejected.

It is to be understood that in this embodiment of this disclosure, certificate data information of the public key certificate (for example, version information of the certificate, a hash value of the certificate, or a root certificate hash value associated with the hash value of the certificate) stored in the chain entry 42a may be further combined to perform signature verification on the first signature information, to ensure reliability of the public key information (that is, the foregoing first public key information) in the public key certificate (that is, the foregoing first public key certificate) for signature verification.

Specifically, the first consensus node may determine certificate data information of the first public key certificate as to-be-processed certificate information, and invoke a certificate data reading method in the first cross-chain reading contract at the second cross-chain reading timestamp to read the public key certificate of the first service object from the target chain. The second cross-chain reading timestamp is a next cross-chain reading timestamp of the first cross-chain reading timestamp. Further, the first consensus node may determine the read certificate data information in the public key certificate of the first service object as target certificate information, and may further perform, in a case that the to-be-processed certificate information remains consistent with the target certificate information, signature verification on the first signature information based on the first public key certificate, and determine a verification result indicating that signature verification succeeds as the signature verification result of the first service object.

It may be understood that when the to-be-processed certificate information remains consistent with the target certificate information, the foregoing first public key certificate needs to be updated with the public key certificate of the user 43b read from the target chain at the second cross-chain reading timestamp, and signature verification may be further performed on the first signature information based on updated public key information in the first public key certificate, to ensure that the first service requested by the user 43b can be smoothly performed in the first chain network.

It is to be understood that the public key certificate of the authorized object involved in this embodiment of this disclosure is obtained after the target consensus node in the target chain network invokes an object identity management contract (that is, the object identity management contract in the embodiment corresponding to FIG. 2) in the target chain to perform identity registration on object data information (for example, the object data information herein may specifically include basic user data information of the user 43b, a transaction request that the user 43b needs to perform, and a service type of the transaction service) submitted by a service object requesting for registration of a corresponding transaction service (for example, the foregoing first service). It is to be understood that when the target consensus node successfully configure the public key certificate corresponding to the corresponding service for the service object requesting for registration of the corresponding transaction service (for example, the foregoing first service), the service object requesting for registration of the corresponding transaction service (for example, the foregoing first service) may be determined as the authorized object, and the public key certificate configured for the authorized object may be written to the target chain (for example, a target chain 41e shown in FIG. 4). Therefore, when the service object subsequently performs the first service in the first chain network, the first consensus node may further perform certificate update processing on the public key certificate of the service object at the chain entry (that is, the foregoing first chain entry) by using the public key certificate read from the target chain in a cross-chain manner. Thus, it can be seen that in this embodiment of this disclosure, the registration data information of the authorized object synchronized from the target chain may be updated based on the foregoing cross-chain reading timestamp.

In addition, it is to be understood that after writing the public key certificate configured for the authorized object (for example, the user 43b shown in FIG. 4) to the target chain (for example, the target chain 41e shown in FIG. 4), the target consensus node may further return the private key information (that is, the foregoing first private key information) synchronously configured for the authorized object (for example, the user 43b shown in FIG. 4) to the user 43b, so that the user 43b may sign, as the first service object based on the first private key information, the transaction service data submitted by the user 43b, to obtain the foregoing first signature information. Thus, it can be seen that the first private key information of the first service object is obtained after the first service object (for example, the user 43b shown in FIG. 4) performs identity registration on the object identity management contract in the target chain. Based on this, the first signature information herein is obtained after the first service node associated with the first service object (for example, the user 43b shown in FIG. 4) signs the foregoing transaction service data based on the first private key information of the first service object (for example, the user 43b shown in FIG. 4).

As shown in FIG. 4, the first consensus node may perform identity verification on the user 43b based on the registration data information of the authorized object obtained from the chain entry 42a, and when identity verification succeeds, may further determine the user 43b as the authorized object, to allow the user 43b to access the first chain network 40a as an access party. It is to be understood that in this case, the first consensus node may perform transaction assembly on the foregoing transaction service data in the first chain network, to obtain the first service associated with the first service object, and may perform transaction broadcasting on the first service as a new transaction in the first chain network, to perform transaction duplicate verification on the new transaction in the first chain network. When transaction duplicate verification succeeds (that is, it is determined that there is no first service the same as the new transaction in the first chain network), the new transaction may be further added to a transaction pool corresponding to the foregoing real-time first service flow. Further, the first cross-chain reading contract shown in FIG. 4 may be invoked based on the first service in the real-time first service flow in the transaction pool to read, in the cross-chain manner, the first service associated information associated with the first service from the target chain 42e. Further, the next step S102 may be performed based on the first service associated information read in the cross-chain manner.

Specifically, the first consensus node may invoke, based on the first service, a permission contract reading method in the first cross-chain reading contract to generate a permission contract access request of the target consensus node (for example, the consensus node 42a) in the target chain network (that is, the target chain network 40b shown in FIG. 4). The permission contract access request is used for instructing the target consensus node (for example, the consensus node 42a) to invoke an object permission management contract on the target chain to obtain the first service associated information associated with the first service. Further, the first consensus node may receive the first service associated information returned by the target consensus node based on the permission contract access request, to further perform the following step S102.

Step S102: Invoke, in response to determining, based on the first service associated information, that the first service object has a first service processing permission corresponding to the first service, the first service processing contract on the first chain to perform the first service, to obtain a first service execution result associated with the first service, and write the first service execution result to the first chain, the first service execution result including the service data indicated by the first service. For example, in response to determining, based on the first service associated information, that the first service node has first service processing permission corresponding to the first service, a first service processing contract on the first chain is invoked by a first consensus node in the first chain network to perform the first service and obtain a first service execution result comprising service data generated by the first service, and the first service execution result is written to the first chain.

The first service associated information includes a service permission type configured for the first service object, a cumulative service volume of the first service object of the service permission type in service duration, and a cumulative service threshold. Specifically, the first consensus node may determine that the first service object has the first service processing permission corresponding to the first service in response to determining, based on the first service associated information, that the service permission type of the first service object is a billing permission type and the cumulative service volume of the first service object of the billing permission type in the service duration does not reach the cumulative service threshold. Further, the first consensus node may obtain, based on the first service processing permission, a contract invoking address and a contract invoking name that are associated with the billing permission type, invoke a service data issuing contract on the first chain based on the contract invoking address and the contract invoking name to integrate the transaction service data corresponding to the first service and key bill information associated with a service data issuing service in the first service and issue an electronic bill for the first service object based on integrated key bill information, and determine the issued electronic bill as the service data indicated by the first service. Further, the first consensus node may determine the key bill information, the service data, and the service data issuing contract as the first service execution result of the service data issuing service in the first service, and transmit a first block including the first service execution result to a verification consensus node on the first chain, so that the verification consensus node performs block verification on the first block to obtain a block verification result. The verification consensus node is a consensus node other than the first consensus node in the first chain network. It Is to be understood that the verification consensus node herein (that is, the foregoing bill verification consensus node) is specifically a consensus node other than the first consensus node in the first chain network. Further, the first consensus node may receive the block verification result returned by the verification consensus node, and write the first block to the first chain in a case that the block verification result indicates that block verification succeeds.

It may be understood that the key bill information herein may include auxiliary metadata information in metadata information read from the target chain. The auxiliary metadata information includes a first service data template and a target tax calculation rule associated with the first service data bill template. The first service data template is a service data template after the target consensus node on the target chain invokes a metadata management contract on the target chain to perform change and uploading on a second service data template. The second service data template is a previous service data template of the first service data template. Metadata change information is submitted by a service management object (service management node) associated with the target consensus node (the service management object herein may be the tax management department in the embodiment corresponding to FIG. 2).

It is to be understood that a specific service quantity and a specific service type of the first service in the real-time service flow determined in the first chain network are not limited in this embodiment of this disclosure. For ease of understanding, an example in which the service type of the first service requested by the user 43*b* shown in FIG. 4 is an electronic bill issuing service in the foregoing bill service is used in this embodiment of this disclosure to describe reading of service associated information (that is, the foregoing first service associated information) associated with the electronic bill issuing service from the target chain 42*e* to further determine that the service permission of the user 43*b* is the first service processing permission. It is to be understood that the first service processing permission herein may be used for characterizing that the user 43*b* has a permission to invoke a first service execution contract on the first chain 41*e* to perform the first service (for example, the foregoing electronic bill issuing service).

It may be understood that the first service associated information herein specifically includes a service permission type configured for the user 43*b* shown in FIG. 4, a cumulative service volume of the user 43*b* of the service permission type in service duration, and a cumulative service threshold. The service permission type herein is configured by the target consensus node for the user 43*b* (that is, the foregoing first service object) requesting for the first service in FIG. 4 through the foregoing object permission management contract. When the first service is the foregoing bill service, the service permission type herein specifically includes the billing permission type, a transfer permission type, a reversal permission type, and an archiving permission type. It is to be understood that when the first service is the foregoing certificate service, the service permission type herein specifically includes a certificate issuing permission type, a transfer permission type, and an archiving permission type. It is to be understood that when the first service is the foregoing prescription service, the service permission type herein specifically includes a prescription making permission type, a transfer permission type, and an archiving permission type. It is to be understood that in difference service scenarios, a specific contract in the first service execution contract deployed on the first chain may be adjusted in combination with the corresponding service permission type.

Based on this, when the first service requested by the user 43*b* for registration to the target consensus node in the target chain network is the electronic bill issuing service, the target consensus node may configure, through the object permission management contract, a corresponding service permission type to be the foregoing service permission type for the user 43*b* (for example, configure a billing permission type for invoking the electronic bill issuing contract on the first chain), configure a cumulative service volume and a cumulative service threshold for the user 43*b* of the service permission type (for example, the billing permission type) in the service duration (for example, an hour), and further write the service permission type (for example, the billing permission type) configured for the user 43*b*, the cumulative service volume of the service 43*b* of the service permission type (for example, the billing permission type) in the service duration (for example, an hour), the cumulative service threshold, and the like to the target chain (for example, the target chain 42*e* shown in FIG. 4) as the foregoing first service associated information.

In this way, when the first consensus node determines, based on the first service associated information obtained from the target chain, that the service permission type of the user 43*b* is the foregoing billing permission type, whether the cumulative service volume of the user 43*b* of the billing permission type in the service duration reaches the cumulative service threshold may be further determined (for example, when the user 43*b* is a billing enterprise, the cumulative service volume herein specifically means whether a quantity of bills issued by the billing enterprise in an hour reaches a maximum quantity of bills and whether a billing limit reaches a maximum billing limit). If the cumulative service volume of the user 43b in the service duration does not reach the cumulative service threshold, it may be determined that the user 43b has the first service processing permission corresponding to the first service. Further, the contract invoking address and the contract invoking name associated with the billing permission type may be obtained based on the first service processing permission corresponding to the first service, to invoke the electronic bill issuing contract on the first chain based on the contract invoking address and the contract invoking name to obtain the key bill information associated with the electronic bill issuing service. Further, the obtained key bill information may be integrated, and an electronic bill (the electronic bill herein may be specifically an electronic invoice) is issued for the user 43b based on the integrated key bill information. It is to be understood that in this embodiment of this disclosure, the issued electronic bill is collectively referred to as the service data indicated by the first service.

Similarly, when the first consensus node determines, based on the first service associated information obtained from the target chain, that the service permission type of the user 43b is the foregoing transfer permission type, whether the cumulative service volume of the user 43b of the transfer permission type in the service duration reaches the cumulative service threshold may be further determined (for example, when the user 43b is a reimbursement user, the cumulative service volume herein specifically means whether a reimbursement limit of the reimbursement user in a month reaches a maximum reimbursement limit). If the cumulative service volume of the user 43b in the service duration does not reach the cumulative service threshold, it may be determined that the user 43b has the first service processing permission corresponding to the first service. Further, a contract invoking address and a contract invoking name associated with the transfer permission type may be obtained based on the first service processing permission corresponding to the first service, to invoke an electronic bill transfer contract on the first chain based on the contract invoking address and the contract invoking name to transfer an electronic bill (the electronic bill herein may be specifically an electronic invoice) issued for the user 43b to a second service object. It is to be understood that the second service object herein may be another user (for example, a local tax bureau user in a home location of the user 43b) associated with the first service object.

By analogy, when the first consensus node determines, based on the first service associated information obtained from the target chain, that the service permission type of the user 43b is the foregoing reversal permission type, whether the cumulative service volume of the user 43b of the transfer permission type in the service duration reaches the cumulative service threshold may be further determined (for example, when the user 43b is a reversal user, the cumulative service volume herein specifically means whether a reversal quantity of the reimbursement user in a month reaches a maximum reversal quantity). If the cumulative service volume of the user 43b in the service duration does not reach the cumulative service threshold, it may be determined that the user 43b has the first service processing permission corresponding to the first service. Further, a contract invoking address and a contract invoking name associated with the reversal permission type may be obtained based on the first service processing permission corresponding to the first service, to invoke an electronic bill reversal contract on the first chain based on the contract invoking address and the contract invoking name to issue a credit note for reversal for an electronic bill (the electronic bill herein may be specifically an electronic invoice) issued for the user 43b. It is to be understood that the credit note herein may be used for correcting related bill information in the electronic bill.

Similarly, when the first consensus node determines, based on the first service associated information obtained from the target chain, that the service permission type of the user 43b is the foregoing archiving permission type, whether the cumulative service volume of the user 43b of the archiving permission type in the service duration reaches the cumulative service threshold may be further determined (for example, when the user 43b is an archiving user, the cumulative service volume herein specifically means whether a quantity of archived bills of the archiving user in a month reaches a maximum quantity of archived bills). If the cumulative service volume of the user 43b in the service duration does not reach the cumulative service threshold, it may be determined that the user 43b has the first service processing permission corresponding to the first service. Further, a contract invoking address and a contract invoking name associated with the archiving permission type may be obtained based on the first service processing permission corresponding to the first service, to invoke an electronic bill archiving contract on the first chain based on the contract invoking address and the contract invoking name to perform cold storage processing on an electronic bill (the electronic bill herein may be specifically an electronic invoice) issued for the user 43b. It is to be understood that the first consensus node herein may invoke the electronic bill archiving contract to perform cold storage processing on an electronic bill that has expired for a long time (that is, that cannot be circulated any more) or an electronic bill requested less in the cross-chain manner, to release a ledger storage resource of a blockchain ledger corresponding to this bill chain.

Thus, it can be seen that the first service includes at least one of the following transaction services: an electronic bill issuing service, an electronic bill circulation service, an electronic bill reversal service, and an electronic bill archiving service. The bill service processing contract includes at least an electronic bill issuing contract for performing the electronic bill issuing service, an electronic bill circulation contract for performing the electronic bill circulation service, an electronic bill reversal contract for performing the electronic bill reversal service, and an electronic bill archiving contract for performing the electronic bill archiving service. The electronic bill issuing service is used for instructing the first consensus node to invoke the electronic bill issuing contract on the bill chain to issue an electronic invoice for the first service object. The electronic bill circulation service is used for instructing the first consensus node to invoke the electronic bill circulation contract on the bill chain to circulate the electronic invoice from the first service object to a second service object. The electronic bill reversal service is used for instructing the first consensus node to invoke the electronic bill reversal service on the bill chain to issue a credit note corresponding to the electronic invoice, and the credit note is used for changing related bill information in the electronic invoice. The electronic bill archiving service is used for instructing the first consensus node to invoke the electronic bill archiving contract on the bill chain to perform cold storage processing on an electronic invoice satisfying a bill archiving condition on the bill chain.

It is to be understood that the blockchain system is applied to a blockchain electronic prescription scenario. When the first service is the prescription service related to an electronic prescription (for example, the user 43b requests to obtain a corresponding electronic prescription from the first chain network), the foregoing real-time service flow may be specifically a real-time electronic prescription flow. To be specific, the real-time electronic prescription flow may be specifically a prescription service flow including a large quantity of prescription services that are determined by the first consensus node through the foregoing first chain entry (for example, the chain entry 42a) and that are in the high-frequency request state. In this case, the first chain network corresponding to the first chain entry may be specifically a prescription chain network. For another example, the blockchain system is applied to a blockchain electronic certificate scenario. When the first service is the certificate service related to an electronic certificate (for example, the user 43b requests to obtain a corresponding electronic certificate from the first chain network, and the electronic certificate herein may be specifically an electronic skill certificate), the real-time service flow herein may be specifically a real-time electronic certificate flow. To be specific, the real-time electronic certificate flow may be specifically a certificate service flow including a large quantity of certificate services that are determined by the first consensus node through the foregoing first chain entry (for example, the chain entry 42a) and that are in the high-frequency request state. In this case, the first chain network corresponding to the first chain entry may be specifically a certificate chain network. It is to be understood that for specific implementations of performing the prescription service and the certificate service in the first chain network, reference may be made to the descriptions about the specific process of performing the bill service in the first chain network, and details are not described herein again.

The first consensus node may further specify, in a target transaction corresponding to the first service execution result during writing of the first service execution result to the first chain, a processing terminal identifier of a service data processing terminal associated with the service data. The processing terminal identifier is used for characterizing that the service data processing terminal has a function of obtaining, through clearing, the service data from the first chain. It is to be understood that the service data processing terminal herein may be a terminal corresponding to the electronic bill data center in the embodiment corresponding to FIG. 2. In this way, the first consensus node may obtain, in response to obtaining a transaction clearing request transmitted by the service data processing terminal, the target transaction from the first chain based on the processing terminal identifier carried in the transaction clearing request, obtain, through clearing, the service data from the first service execution result comprised in the target transaction, and return the service data to the service data processing terminal, so that the service data processing terminal performs data analysis (for example, perform bill analysis) on the service data. Bill analysis herein specifically means that the electronic bill data center may perform, through the service data processing terminal, off-chain statistics (for example, make statistics on a time division billing quantity of a user 43a that is the billing enterprise), on a large quantity of electronic bills recorded on the first chain, data analysis (for example, analyze a billing limit and a billing quantity of the user 43a that is the billing enterprise, to perform risk determining on the user 43a, for example, when the user 43a is determined as a risk enterprise, the tax management department is notified to invoke the object permission management contract on the first chain to freeze a billing qualification of the user 43a, or limit the billing limit of the user 43a), tax examination (examine a tax payment condition of the user 43a), and the like.

Step S103: Read, in response to obtaining a cross-chain reading request transmitted by a second consensus node based on a second cross-chain reading contract on a second chain, the service data from the first chain based on a second service carried in the cross-chain reading request, and return core data in the service data to the second consensus node, the second consensus node being configured to write a second service execution result corresponding to the second service to a second chain after performing the second service based on the core data, the second chain being a blockchain in the second chain network including the second consensus node, and the second chain network being independent of the first chain network and the target chain network. For example, in response to obtaining a cross-chain reading request transmitted by a second consensus node based on a second cross-chain reading contract on a second chain, the service data is read by the first consensus node from the first chain based on a second service indicated in the cross-chain reading request, and at least a portion of the service data is returned to the second consensus node. The second consensus node is configured to write a second service execution result generated by the second service to the second chain after performing the second service based on the at least a portion of the service data generated by the first service. The second chain is a blockchain in a second chain network comprising the second consensus node, and the second chain network being independent of the first chain network and the target chain network.

Specifically, the first consensus node obtains, from the cross-chain reading request, in the case that the cross-chain reading request transmitted by the second consensus node based on the second cross-chain reading contract on the second chain, the second service submitted by a second service object through a second service entry associated with the second chain. The second service entry is used for allowing, in response to determining that the second service object has a permission to process the second service on the second chain, the second service object to invoke the second cross-chain reading contract through the second consensus node. Further, the first consensus node may read the service data from the first chain based on cross-chain request data information indicated by the second service, determine the core data in the read service data as cross-chain request response information corresponding to the cross-chain reading request, and return the cross-chain request response information to the second consensus node, so that the second consensus node invokes, based on the cross-chain request response information, a second service contract on the second chain to perform the second service. It is to be understood that in this embodiment of this disclosure, if the second service is a derivative service of the first service, the cross-chain request data information may be specifically derivative service data information of the derivative service.

Figure 5:
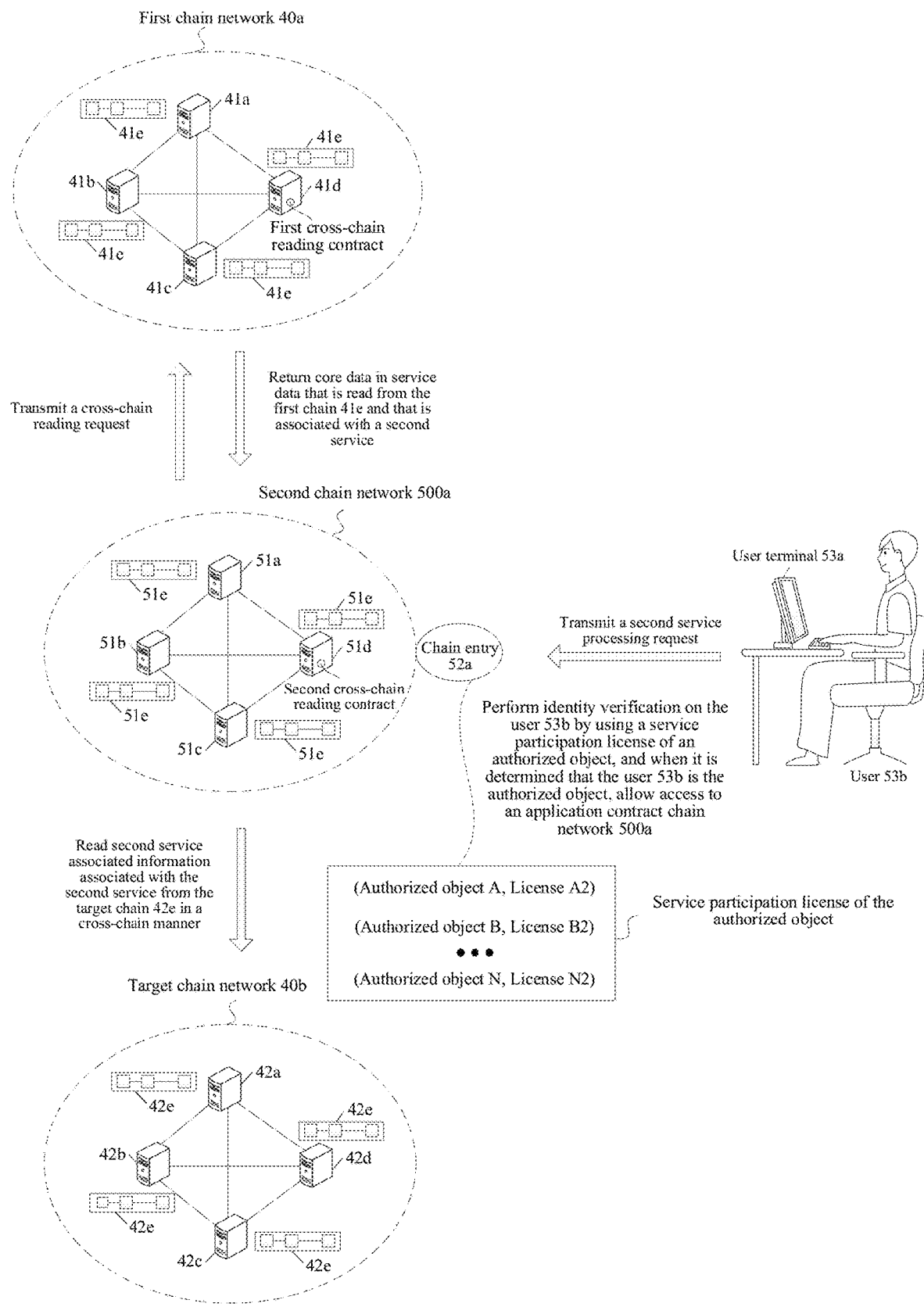
FIG. 5 is a schematic diagram of a scenario in which cross-chain interaction is performed between three chains according to an embodiment of this disclosure.

For ease of understanding, how to implement cooperation between three chains in the blockchain system is described in this embodiment of this disclosure with reference to the first chain network 40a and the target chain network 40b shown in FIG. 4. Further, refer to FIG. 5. FIG. 5 is a schematic diagram of a scenario in which cross-chain interaction is performed between the three chains according to an embodiment of this disclosure. A user 53a shown in FIG. 5 may be the second service object requesting to perform the second service. A user terminal 53a used by the user 53a may be a second service node. The second service node herein may be the same as the first service node, or may be different from the first service node. This is not limited herein. In addition, a chain entry 52a shown in FIG. 5 is a second chain entry. The second chain entry herein may be the tax derivative service entry in the embodiment corresponding to FIG. 2. It is to be understood that in this embodiment of this disclosure, after obtaining a service participation license issued by the tax management department through the foregoing management consensus node, a tax derivative object (for example, a user 53b shown in FIG. 5) may access a second chain network 500a shown in FIG. 5 through the service participation license.

The chain entry 52a shown in FIG. 5 stores the service participation license of the authorized object synchronized from the target chain 42e. Specifically, as shown in FIG. 5, the service participation license of the authorized object may include a license A2 of the authorized object A, a license B2 of the authorized object B, . . . , and a license N2 of the authorized object N. In this way, the user 53b shown in FIG. 5 may add, based on a target service participation license configured by the tax management department through the target consensus node, the target service participation license to a second service processing request shown in FIG. 5, to transmit the second service processing request to the second consensus node (for example, a consensus node 51d shown in FIG. 5), so that the second consensus node may determine, based on the service participation license of the authorized object stored in the chain entry 52a, whether the user 53b may access the second chain network 500a. For example, if the second consensus node finds, at the chain entry 52a, a service participation license the same as the target service participation license, the user 53b is allowed to access the second chain network 500a. If the second consensus node does not find, at the chain entry 52a, a service participation license the same as the target service participation license, the second service processing request transmitted by the user 53b (that is, the foregoing second service object) may be rejected.

It may be understood that the service participation license (a license for short) herein may include but is not limited to a hash value of a public key certificate configured for the user 53b (that is, the foregoing second service object) and an access token or identity certificate configured for the user 53b (that is, the foregoing second service object). Specific content in the license configured by the management consensus node for the user 53b and the like are not limited.

As shown in FIG. 5, the second chain network includes a plurality of consensus nodes. These consensus nodes may specifically include a consensus node 51a, a consensus node 51b, a consensus node 51c, and a consensus node 51d. It is to be understood that the foregoing second cross-chain reading contract is run on all of the consensus nodes herein. For ease of understanding, an example in which the consensus node 51d is the second consensus node and the second cross-chain reading contract is run on the second consensus node is used herein to describe a process in which the second consensus node invokes the second cross-chain reading contract to read the core data in the service data associated with the second service from the first chain 41e corresponding to the first chain network 40a. For example, the second service herein may be the foregoing qualification recognition service. It is to be understood that the first chain 41e is jointly maintained by the consensus nodes (for example, a consensus node 41a, a consensus node 41b, the consensus node 41c, and the consensus node 41d shown in FIG. 5) in the first chain network 40a.

It can be learned with reference to the embodiment described in FIG. 4 that the first consensus node may write the service data obtained by performing the first service to the target chain 41e. Therefore, when determining, based on the second service associated information, that the second service object has the second service processing permission corresponding to the second service, the second consensus node (for example, the consensus node 51d shown in FIG. 5) may invoke the second cross-chain reading contract to generate the cross-chain reading request associated with the second service, and transmit the cross-chain reading request to the first consensus node (for example, the consensus node 41d shown in FIG. 5).

In this case, the first consensus node (for example, the consensus node 41d shown in FIG. 5) may read, based on the received cross-chain reading request, the service data associated with the second service (for example, the qualification recognition service) from the first chain 41e corresponding to the first chain network 40a, and further return the core data in the read service data to the second consensus node (for example, the consensus node 51d shown in FIG. 5). It is to be understood that an amount of the service data read in the cross-chain manner is not limited in this embodiment of this disclosure.

For example, when the first service is the bill service, the service data that is read by the first consensus node from the first chain 41e and that is associated with the second service may be specifically one or more electronic bills obtained after the electronic bill issuing service in the bill service is performed in the first chain network. Further, core data in these read electronic bills is returned to the second consensus node, to perform the second service requested by the user 53b in the second chain network shown in FIG. 5 (for example, an enterprise qualification of the billing enterprise requesting to issue these electronic bills may be recognized based on the core data in the electronic bills obtained in batches).

In other words, when reading the core data in the foregoing service data in the cross-chain manner, the second consensus node may further perform the second service based on the core data, and write the second service execution result corresponding to the second service to the second chain (for example, the second chain 51e in FIG. 5).

It is to be understood that for a specific implementation in which the second consensus node invokes the second cross-chain reading contract to read the second service associated information associated with the second service from the target chain 42e, reference may be made to the descriptions about a specific process in which the first consensus node invokes the first cross-chain reading contract to read the first service associated information associated with the first service from the target chain 42e, and details are not described herein again.

Thus, it can be seen that this embodiment of this disclosure provides a completely new multi-blockchain cooperation mechanism. The multi-blockchain cooperation mechanism aims to emphasizing that it may be ensured through cooperation between three chains, that is, the first chain, the target chain, and the second chain, that a consensus node (that is, the first consensus node) in the first chain network may be configured to independently process some real-time service flows (that is, the foregoing first service) with large request data volumes. Therefore, in a service scenario in which the core data (that is, some bill information that is visible to the authorized on the first chain) of a blockchain electronic bill, the first consensus node (for example, the foregoing bill consensus node) may participate in maintaining the first chain in the first chain network, and the first chain is mainly used for storing the first service execution result. For example, the first chain may be used for storing service data obtained by performing each first service in the real-time service flow. In addition, the second consensus node (for example, the foregoing application consensus node) may participate in maintaining the second chain in the second chain network, and the second chain is mainly used for storing the second service execution result. The second service execution result herein is determined based on the second service performed based on the core data (that is, some data that is visible to the authorized in the service data) in the service data circulated from the first chain to the second chain in the cross-chain manner. Moreover, the target consensus node herein (for example, the management consensus node in the embodiment corresponding to FIG. 2) may be configured to perform centralized management on a permission of a service object accessing the second chain network and the first chain network. It is clear that separate data storage with a plurality of deployed blockchains can effectively reduce a mixing degree of data storage on each blockchain. In addition, cooperation between the plurality of blockchains can improve security of data stored on each blockchain.

Figure 6:
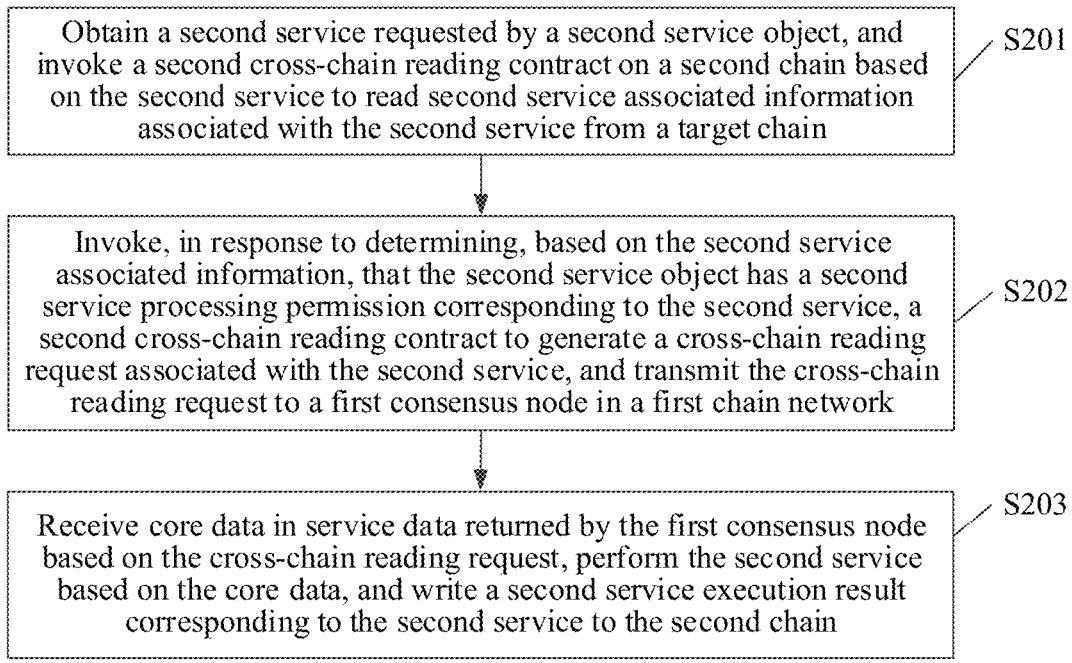
FIG. 6 shows a multi-blockchain data processing method according to an embodiment of this disclosure.

Further, refer to FIG. 6. FIG. 6 shows a multi-blockchain data processing method according to an embodiment of this disclosure. As shown in FIG. 6, the method may be performed by the second consensus node in the foregoing second chain network. For example, the second consensus node may be any consensus node in the consensus network 300a shown in FIG. 1. The method may specifically include the following step S201 to step S203.

Step S201: Obtain a second service requested by a second service object, and invoke a second cross-chain reading contract on a second chain based on the second service to read second service associated information associated with the second service from a target chain, the second chain being a blockchain in the second chain network, the target chain being a blockchain in a target chain network, the target chain network being independent of the second chain network, and the second chain being different from the target chain. For example, a second service request is received from a second service node, and a second cross-chain reading contract on a second chain is invoked to read second service associated information from a target chain. The second chain is a blockchain in a second chain network, the target chain being a blockchain in a target chain network independent of the second chain network.

Step S202: Invoke, in response to determining, based on the second service associated information, that the second service object has a second service processing permission corresponding to the second service, the second cross-chain reading contract to generate a cross-chain reading request associated with the second service, and transmit the cross-chain reading request to a first consensus node in a first chain network, the cross-chain reading request being used for instructing the first consensus node to read service data associated with the second service from a first chain corresponding to the first chain network, the first chain network being independent of the second chain network and the target chain network, the service data being determined by the first consensus node by invoking a first service processing contract on the first chain in response to determining, based on the first service associated information, that a first service object has a first service processing permission corresponding to a first service, and the first service associated information being read by the first consensus node from the target chain by invoking a first cross-chain reading contract on the first chain based on the first service. For example, in response to determining, based on the second service associated information, that the second service node has a second service processing permission corresponding to the second service, a second cross-chain reading contract is invoked by a second consensus node to generate a cross-chain reading request associated with the second service, and the cross-chain reading request is transmitted to a first consensus node in a first chain network. The cross-chain reading request requests the first consensus node to read service data associated with the second service from a first chain corresponding to the first chain network independent of the second chain network and the target chain network. The service data associated with the second service is obtained by the first consensus node by invoking a first service processing contract on the first chain in response to determining, based on the first service associated information, that a first service node has a first service processing permission corresponding to a first service. The first service associated information is read by the first consensus node from the target chain by invoking a first cross-chain reading contract on the first chain based on the first service.

Step S203: Receive core data in the service data returned by the first consensus node based on the cross-chain reading request, perform the second service based on the core data, and write a second service execution result corresponding to the second service to the second chain. For example, at least a portion of the service data returned by the first consensus node based on the cross-chain reading request is received, the second service is performed based on the at least a portion of the service data, and a second service execution result corresponding to the second service is written to the second chain.

It may be understood that for specific implementations of step S201 to step S203, reference may be made to the descriptions about the second consensus node in the embodiment corresponding to FIG. 3, and details are not described herein again.

Thus, it can be seen that this embodiment of this disclosure provides a completely new multi-blockchain cooperation mechanism. The multi-blockchain cooperation mechanism aims to emphasizing that it may be ensured through cooperation between three chains, that is, the first chain, the target chain, and the second chain, that a consensus node (that is, the first consensus node) in the first chain network may be configured to independently process some real-time service flows (for example, a bill service flow including the foregoing bill service, a prescription service flow including the foregoing prescription service, or a certificate service flow including the foregoing certificate service) with large request data volumes. Therefore, in a service scenario in which the core data (that is, some core data that is visible to the authorized in the service data stored on the first chain) on a blockchain, the first consensus node may participate in maintaining the first chain in the first chain network, and the first chain is mainly used for storing the service data in the real-time service data flow obtained after the first service is performed. In addition, the second consensus node may participate in maintaining the second chain in the second chain network, and the second chain is mainly used for storing the second service execution result. The second service execution result herein is determined based on the second service performed based on the core data (that is, core data) in the service data circulated from the first chain to the second chain in the cross-chain manner. Moreover, the target consensus node herein may be configured to perform centralized management on a permission of a service object accessing the second chain network and the first chain network. It is clear that separate data storage with a plurality of deployed blockchains can effectively reduce a mixing degree of data storage on each blockchain. In addition, cooperation between the plurality of blockchains can improve security of data stored on each blockchain.

Figure 7:
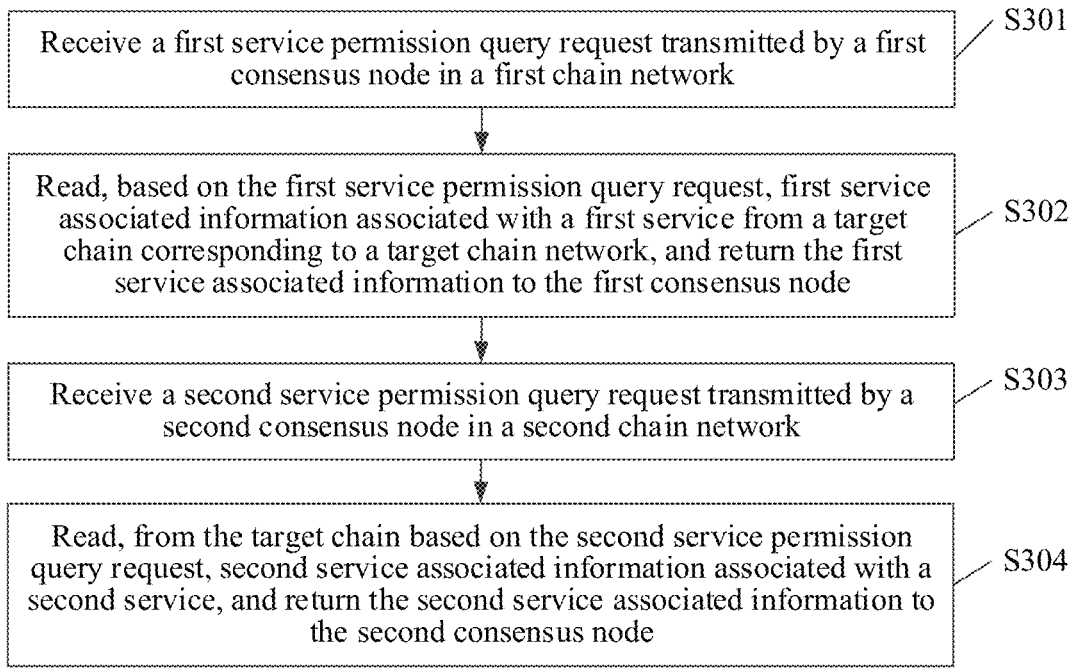
FIG. 7 shows a multi-blockchain data processing method according to an embodiment of this disclosure.

Further, refer to FIG. 7. FIG. 7 shows a multi-blockchain data processing method according to an embodiment of this disclosure. As shown in FIG. 7, the method may be performed by the target consensus node in the foregoing target chain network. For example, the target consensus node may be any consensus node in the consensus network 100*a* shown in FIG. 1. The method may specifically include the following step S301 to step S304.

Step S301: Receive a first service permission query request transmitted by a first consensus node in a first chain network, the first service permission query request being determined by the first consensus node by invoking a first cross-chain reading contract on a first chain in response to obtaining a first service submitted by a first service object, the first chain being a blockchain in the first chain network, and the first chain network being independent of the target chain network.

Step S302: Read, from a target chain corresponding to the target chain network based on the first service permission query request, first service associated information associated with the first service, and returning the first service associated information to the first consensus node, so that the first consensus node invokes, in response to determining, based on the first service associated information, that the first service object has a first service processing permission corresponding to the first service, a first service processing contract on the first chain to perform the first service, to obtain a first service execution result for writing to the first chain, the first service execution result including the service data indicated by the first service.

Step S303: Receive a second service permission query request transmitted by a second consensus node in a second chain network, the second service permission query request being determined by the second consensus node by invoking a second cross-chain reading contract on a second chain corresponding to the second chain network in response to obtaining a second service submitted by a second service object, and the second chain network being independent of the first chain network and the target chain network.

Step S304: Read, from the target chain based on the second service permission query request, second service associated information associated with the second service, and returning the second service associated information to the second consensus node, so that the second consensus node invokes, in response to determining, based on the second service associated information, that the second service object has a second service processing permission corresponding to the second service, a second cross-chain reading contract to generate a cross-chain reading request that is for transmission to the first consensus node and that is associated with the second service, the cross-chain reading request being used for instructing the first consensus node to read the service data from the first chain.

It may be understood that for specific implementations of step S301 to step S304, reference may be made to the descriptions about the target consensus node in the embodiment corresponding to FIG. 3, and details are not described herein again.

Thus, it can be seen that this embodiment of this disclosure provides a completely new multi-blockchain cooperation mechanism. The multi-blockchain cooperation mechanism aims to emphasizing that it may be ensured through cooperation between three chains, that is, the first chain, the target chain, and the second chain, that a consensus node (that is, the first consensus node) in the first chain network may be configured to independently process some real-time service flows (that is, the foregoing first service) with large request data volumes. Therefore, in a service scenario in which the core data (that is, some core data that is visible to the authorized on the first chain) on a blockchain, the first consensus node may participate in maintaining the first chain in the first chain network, and the first chain is mainly used for storing the service data obtained after a first service flow is processed in real time. In addition, the second consensus node may participate in maintaining the second chain in the second chain network, and the second chain is mainly used for storing the second service execution result. The second service execution result herein is determined based on the second service performed based on the core data in the service data circulated from the first chain to the second chain in the cross-chain manner. Moreover, the target consensus node herein may be configured to perform centralized management on a permission of a service object accessing the second chain network and the first chain network. It is clear that separate data storage with a plurality of deployed blockchains can effectively reduce a mixing degree of data storage on each blockchain. In addition, cooperation between the plurality of blockchains can improve security of data stored on each blockchain.

Figure 8:
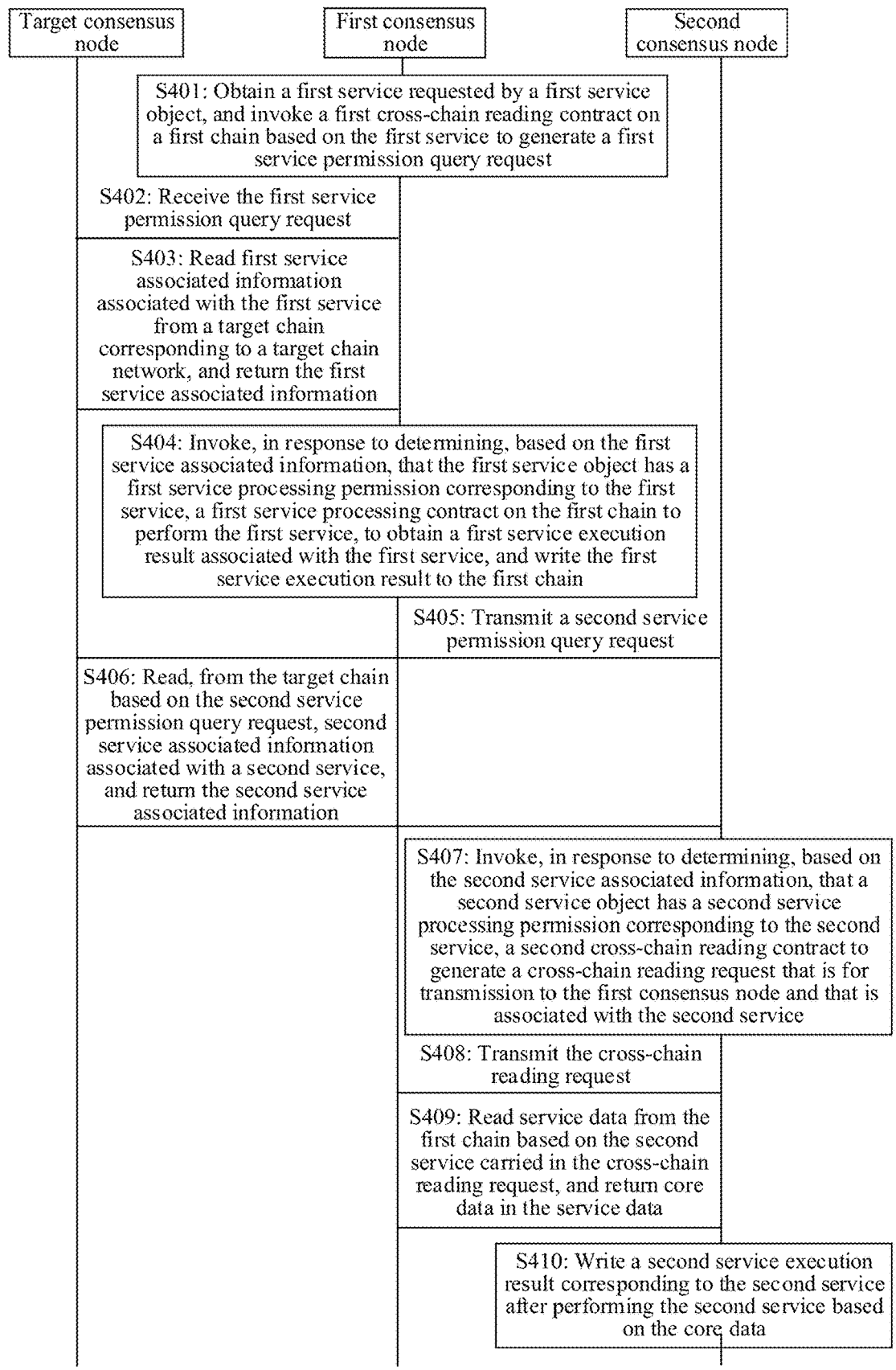
FIG. 8 shows a multi-blockchain data processing method according to an embodiment of this disclosure.

Further, refer to FIG. 8. FIG. 8 shows a multi-blockchain data processing method according to an embodiment of this disclosure. As shown in FIG. 8, the method may be jointly performed by the first consensus node in the foregoing first chain network, the second consensus node in the second chain network, and the target consensus node in the target chain network. For example, the first consensus node herein may be any consensus node in the consensus network 200*a* shown in FIG. 1. The second consensus node may be any consensus node in the consensus network 300*a* shown in FIG. 1. The target consensus node may be any consensus node in the consensus network 100*a* shown in FIG. 1. It is to be understood that the first chain network is independent of the target chain network and the second chain network. In this case, the method may specifically include the following step S401 to step S410.

Step S401: The first consensus node is configured to obtain a first service requested by a first service object, and invoke a first cross-chain reading contract on a first chain based on the first service to generate a first service permission query request.

Step S402: The first consensus node transmits the first service permission query request to the target consensus node.

Step S403: The target consensus node is configured to read, in response to obtaining the first service permission query request transmitted by the first consensus node, first service associated information associated with the first service from a target chain corresponding to the target chain network, and return the first service associated information to the first consensus node.

Step S404: The first consensus node invokes, in response to determining, based on the first service associated information, that the first service object has a first service processing permission corresponding to the first service, a first service processing contract on the first chain to perform the first service, to obtain a first service execution result associated with the first service, and writes the first service execution result to the first chain.

The first service execution result includes service data indicated by the first service.

Step S405: The target consensus node receives a second service permission query request transmitted by the second consensus node in the second chain network.

The second service permission query request is determined by the second consensus node by invoking a second cross-chain reading contract on a second chain corresponding to the second chain network in response to obtaining a second service submitted by a second service object. The second chain network is independent of the first chain network and the target chain network.

Step S406: The target consensus node reads, from the target chain based on the second service permission query request, second service associated information associated with the second service, and returns the second service associated information to the second consensus node.

Step S407: The second consensus node invokes, in response to determining, based on the second service associated information, that the second service object has a second service processing permission corresponding to the second service, the second cross-chain reading contract to generate a cross-chain reading request that is for transmission to the first consensus node and that is associated with the second service.

The cross-chain reading request is used for instructing the first consensus node to read the service data from the first chain.

Step S408: The second consensus node transmits the cross-chain reading request to the first consensus node.

It is to be understood that the cross-chain reading request involved in step S408 is generated by the second consensus node by invoking the second cross-chain reading contract in response to determining, based on the second service associated information, that the second service object has the second service processing permission corresponding to the second service. The second service associated information is read by the second consensus node from the target chain by invoking the second cross-chain reading contract based on the second service.

Step S409: The first consensus node reads, in response to obtaining a cross-chain reading request transmitted by the second consensus node, the service data from the first chain based on the second service carried in the cross-chain reading request, and returns core data in the service data to the second consensus node.

Step S410: The second consensus node writes a second service execution result corresponding to the second service to a second chain after performing the second service based on the core data.

Thus, it can be seen that this embodiment of this disclosure provides a completely new multi-blockchain cooperation mechanism. The multi-blockchain cooperation mechanism aims to emphasizing that it may be ensured through cooperation between three chains, that is, the first chain, the target chain, and the second chain, that a consensus node (that is, the first consensus node) in the first chain network may be configured to independently process some real-time service flows (that is, the foregoing first service) with large request data volumes. Therefore, in a service scenario in which the core data (that is, some core data that is visible to the authorized on the first chain) on a blockchain, the first consensus node may participate in maintaining the first chain in the first chain network, and the first chain is mainly used for storing the service data obtained after the foregoing real-time service flow is performed. In addition, the second consensus node may participate in maintaining the second chain in the second chain network, and the second chain is mainly used for storing the second service execution result. The second service execution result herein is determined based on the second service performed based on the core data in the service data circulated from the first chain to the second chain in the cross-chain manner. Moreover, the target consensus node herein may be configured to perform centralized management on a permission of a service object accessing the second chain network and the first chain network. It is clear that separate data storage with a plurality of deployed blockchains can effectively reduce a mixing degree of data storage on each blockchain. In addition, cooperation between the plurality of blockchains can improve security of data stored on each blockchain.

Figure 9:
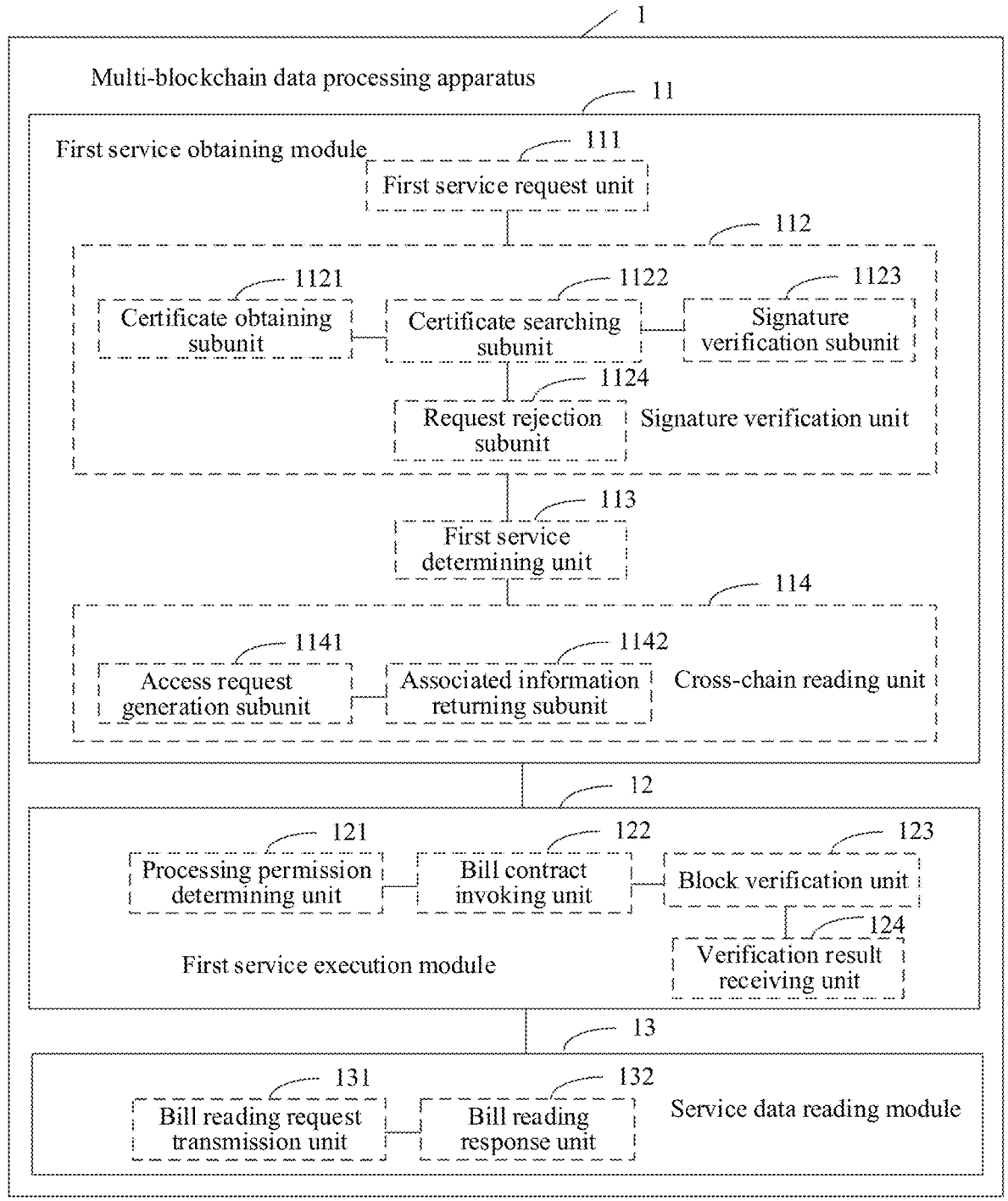
FIG. 9 is a schematic diagram of a structure of a multi-blockchain data processing apparatus according to an embodiment of this disclosure.

Further, refer to FIG. 9. FIG. 9 is a schematic diagram of a structure of a multi-blockchain data processing apparatus according to an embodiment of this disclosure. As shown in FIG. 9, the multi-blockchain data processing apparatus 1 may be used in a first consensus node. The first consensus node may be any blockchain node in a first chain network (for example, the foregoing consensus network 200a). For example, the first consensus node may be the consensus node 11c in the embodiment corresponding to FIG. 1. It is to be understood that the multi-blockchain data processing apparatus 1 may be a computer program (including program code) run in a blockchain node (for example, the foregoing consensus node 10c). For example, the multi-blockchain data processing apparatus 1 may be application software. It may be understood that the multi-blockchain data processing apparatus 1 may be configured to perform the corresponding steps in the method provided in the embodiments of this disclosure. As shown in FIG. 9, the multi-blockchain data processing apparatus 1 may include a first service obtaining module 11, a first service execution module 12, and a service data reading module 13.

The first service obtaining module 11 is configured to obtain a first service requested by a first service object, and invoke a first cross-chain reading contract on a first chain based on the first service to read first service associated information associated with the first service from a target chain. The first chain is a blockchain in the first chain network. The target chain is a blockchain in a target chain network. The target chain network is independent of the first chain network. The first chain is different from the target chain.

The first service execution module 12 is configured to invoke, in response to determining, based on the first service associated information, that the first service object has a first service processing permission corresponding to the first service, the first service processing contract on the first chain to perform the first service, to obtain a first service execution result associated with the first service, and write the first service execution result to the first chain. The first service execution result includes service data indicated by the first service.

The service data reading module 13 is configured to read, in response to obtaining a cross-chain reading request transmitted by a second consensus node based on a second cross-chain reading contract on a second chain, the service data from the first chain based on a second service carried in the cross-chain reading request, and return core data in the service data to the second consensus node. The second consensus node is configured to write a second service execution result corresponding to the second service to a second chain after performing the second service based on the core data. The second chain is a blockchain in the second chain network including the second consensus node. The second chain network is independent of the first chain network and the target chain network.

A chain entry corresponding to the first chain network is a first chain entry. The first chain entry stores registration data information of an authorized object synchronized by the first consensus node from the target chain through the first cross-chain reading contract at a first cross-chain reading timestamp.

The first service obtaining module 11 includes a first service request unit 111, a signature verification unit 112, a first service determining unit 113, and a cross-chain reading unit 114.

The first service request unit 111 is configured to obtain, through the first chain entry of the first chain network, a first service processing request transmitted by a first service node corresponding to the first service object based on the first service. The first service processing request carries transaction service data submitted by the first service object for the first service and first signature information of the first service object. The first signature information is obtained after the first service node associated with the first service object signs the transaction service data based on first private key information of the first service object. The first private key information of the first service object is obtained after the first service object performs identity registration through an object identity management contract in the target chain.

The signature verification unit 112 is configured to obtain the first signature information from the first service processing request, and perform signature verification on the first signature information based on the registration data information of the authorized object stored in the first chain entry, to obtain a signature verification result of the first service object.

The first service determining unit 113 is configured to determine, in a case that the signature verification result of the first service object indicates that signature verification succeeds, that the first service object is the authorized object, and determine, based on the transaction service data, the first service associated with the first service object.

The cross-chain reading unit 114 is configured to invoke the first cross-chain reading contract based on the first service to read the first service associated information associated with the first service from the target chain.

The registration data information of the authorized object includes a public key certificate of the authorized object. The public key certificate of the authorized object is obtained after a target consensus node in the target chain network invokes the object identity management contract in the target chain to perform identity registration on object data information (node data information) submitted by the authorized object (authorized node).

For specific implementations of the first service request unit 111, the signature verification unit 112, the first service determining unit 113, and the cross-chain reading unit 114, refer to the descriptions about step S101 in the embodiment corresponding to FIG. 3. Details are not described herein again.

The signature verification unit 112 includes a certificate obtaining subunit 1121, a certificate searching subunit 1122, and a signature verification subunit 1123.

The certificate obtaining subunit 1121 is configured to obtain the first signature information from the first service processing request, and obtain the public key certificate of the authorized object from the registration data information of the authorized object stored in the first chain entry. A public key certificate of one authorized object includes public key information of the one authorized object.

The certificate searching subunit 1122 is configured to search, in the public key certificate of the authorized object, for a public key certificate of the first service object, and in a case that the public key certificate of the first service object is found, determine the found public key certificate of the first service object as a first public key certificate, and determine public key information in the first public key certificate as first public key information of the first service object.

The signature verification subunit 1123 is configured to perform signature verification on the first signature information based on the first public key certificate and the first public key information to obtain the signature verification result of the first service object.

The signature verification subunit 1123 is specifically configured to determine certificate data information of the first public key certificate as to-be-processed certificate information, and invoke a certificate data reading method in the first cross-chain reading contract at the second cross-chain reading timestamp to read the public key certificate of the first service object from the target chain. The second cross-chain reading timestamp is a next cross-chain reading timestamp of the first cross-chain reading timestamp.

The signature verification subunit 1123 is further specifically configured to determine the read certificate data information in the public key certificate of the first service object as target certificate information.

The signature verification subunit 1123 is further specifically configured to perform, in a case that the to-be-processed certificate information remains consistent with the target certificate information, signature verification on the first signature information based on the first public key certificate, and determine a verification result indicating that signature verification succeeds as the signature verification result of the first service object.

For specific implementations of the certificate obtaining subunit 1121, the certificate searching subunit 1122, and the signature verification subunit 1123, refer to the descriptions about a specific process of signature verification in the embodiment corresponding to FIG. 3. Details are not described herein again.

The signature verification unit 112 further includes a request rejection subunit 1124.

The request rejection subunit 1124 is configured to determine the first service object as an illegal service object in a case that the public key certificate of the first service object is not found from the public key certificate of the authorized object, and reject the first service processing request transmitted by the illegal service object.

For a specific implementation of the request rejection subunit 1124, refer to the descriptions about a specific process of signature verification in the embodiment corresponding to FIG. 3. Details are not described herein again.

The cross-chain reading unit 114 includes an access request generation subunit 1141 and an associated information returning subunit 1142.

The access request generation subunit 1141 is configured to invoke, based on the first service, a permission contract reading method in the first cross-chain reading contract to generate a permission contract access request of a target consensus node in the target chain network. The permission contract access request is used for instructing the target consensus node to invoke an object permission management contract on the target chain to obtain the first service associated information associated with the first service.

The associated information returning subunit 1142 is configured to receive the first service associated information returned by the target consensus node based on the permission contract access request.

For specific implementations of the access request generation subunit 1141 and the associated information returning subunit 1142, refer to the descriptions about a specific process of reading the first service associated information through the first cross-chain reading contract in the cross-chain manner in the embodiment corresponding to FIG. 3. Details are not described herein again.

The first service associated information includes a service permission type configured for the first service object, a cumulative service volume of the first service object of the service permission type in service duration, and a cumulative service threshold.

The first service execution module 12 includes a processing permission determining unit 121, a bill contract invoking unit 122, a block verification unit 123, and a verification result receiving unit 124.

The processing permission determining unit 121 is configured to determine that the first service object has the first service processing permission corresponding to the first service in response to determining, based on the first service associated information, that the service permission type of the first service object is a billing permission type and the cumulative service volume of the first service object of the billing permission type in the service duration does not reach the cumulative service threshold.

The bill contract invoking unit 122 is configured to obtain, based on the first service processing permission, a contract invoking address and a contract invoking name that are associated with the billing permission type, invoke an electronic bill issuing contract on the first chain based on the contract invoking address and the contract invoking name to integrate transaction service data corresponding to the first service and key bill information associated with an electronic bill issuing service in the first service and issue an electronic bill for the first service object based on integrated key bill information, and determine the issued electronic bill as service data indicated by the first service.

The block verification unit 123 is configured to determine the key bill information, the service data, and the electronic bill issuing contract as the first service execution result of the electronic bill issuing service in the first service, and transmit a first block comprising the first service execution result to a verification consensus node on the first chain, so that the verification consensus node performs block verification on the first block to obtain a block verification result. The verification consensus node is a consensus node other than the first consensus node in the first chain network.

The verification result receiving unit 124 is configured to receive the block verification result returned by the verification consensus node, and write the first block to the first chain in a case that the block verification result indicates that block verification succeeds.

For specific implementations of the processing permission determining unit 121, the bill contract invoking unit 122, the block verification unit 123, and the verification result receiving unit 124, refer to the descriptions about step S102 in the embodiment corresponding to FIG. 3. Details are not described herein again.

The key bill information includes auxiliary metadata information read from the target chain. The auxiliary metadata information includes a first electronic bill template and a target tax calculation rule associated with the first electronic bill template. The first electronic bill template is an electronic bill template after the target consensus node on the target chain invokes a metadata management contract on the target chain to perform change and uploading on a second electronic bill template. The second electronic bill template is a previous electronic bill template that is prior to the first electronic bill template. Metadata change information is submitted by a service management object associated with the target consensus node.

The first service includes at least one of the following transaction services: an electronic bill issuing service, an electronic bill circulation service, an electronic bill reversal service, and an electronic bill archiving service. The first service processing contract includes at least an electronic bill issuing contract for performing the electronic bill issuing service, an electronic bill circulation contract for performing the electronic bill circulation service, an electronic bill reversal contract for performing the electronic bill reversal service, and an electronic bill archiving contract for performing the electronic bill archiving service.

The electronic bill issuing service is used for instructing the first consensus node to invoke the electronic bill issuing contract on the first chain to issue an electronic invoice for the first service object. The electronic bill circulation service is used for instructing the first consensus node to invoke the electronic bill circulation contract on the first chain to circulate the electronic invoice from the first service object to a second service object. The electronic bill reversal service is used for instructing the first consensus node to invoke the electronic bill reversal service on the first chain to issue a credit note corresponding to the electronic invoice, and the credit note is used for changing related bill information in the electronic invoice. The electronic bill archiving service is used for instructing the first consensus node to invoke the electronic bill archiving contract on the first chain to perform cold storage processing on an electronic invoice satisfying a bill archiving condition on the first chain.

The service data reading module 13 includes a bill reading request transmission unit 131 and a bill reading response unit 132.

The bill reading request transmission unit 131 is configured to obtain, from the cross-chain reading request, in the case that the cross-chain reading request transmitted by the second consensus node based on the second cross-chain reading contract on the second chain, the second service submitted by a second service object through a second service entry associated with the second chain. The second service entry is used for allowing, in response to determining that the second service object has a permission to process the second service on the second chain, the second service object to invoke the second cross-chain reading contract through the second consensus node.

The bill reading response unit 132 is configured to read the service data from the first chain based on cross-chain request data information indicated by the second service, determine the core data in the read service data as cross-chain request response information corresponding to the cross-chain reading request, and return the cross-chain request response information to the second consensus node, so that the second consensus node invokes, based on the cross-chain request response information, a second service contract on the second chain to perform the second service.

For specific implementations of the bill reading request transmission unit 131 and the bill reading response unit 132, refer to the descriptions about step S103 in the embodiment corresponding to FIG. 3. Details are not described herein again.

The first service execution module 12 is further configured to specify, in a target transaction corresponding to the first service execution result during writing of the first service execution result to the first chain, a processing terminal identifier of a service data processing terminal associated with the service data. The processing terminal identifier is used for characterizing that the service data processing terminal has a function of obtaining, through clearing, the service data from the first chain.

The first service execution module 12 is further configured to obtain, in response to obtaining a transaction clearing request transmitted by the service data processing terminal, the target transaction from the first chain based on the processing terminal identifier carried in the transaction clearing request, obtain, through clearing, the service data from the first service execution result comprised in the target transaction, and return the service data to the service data processing terminal, so that the service data processing terminal performs data analysis on the service data.

For specific implementations of the first service obtaining module 11, the first service execution module 12, and the service data reading module 13, refer to the descriptions about step S101 to step S103 in the embodiment corresponding to FIG. 3. Details are not described herein again. It is to be understood that beneficial effects of the same method are not described herein again.

Figure 10:
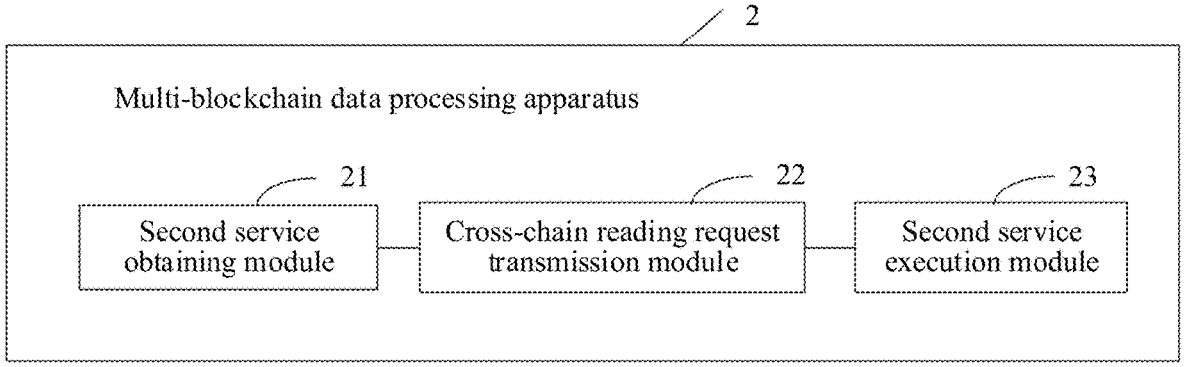
FIG. 10 is a schematic diagram of a structure of a multi-blockchain data processing apparatus according to an embodiment of this disclosure.

Further, refer to FIG. 10. FIG. 10 is a schematic diagram of a structure of a multi-blockchain data processing apparatus according to an embodiment of this disclosure. As shown in FIG. 10, the multi-blockchain data processing apparatus 2 may be used in a second consensus node. The second consensus node may be any blockchain node in a second chain network (for example, the foregoing consensus network 300a). For example, the second consensus node may be the consensus node 12c in the embodiment corresponding to FIG. 1. It is to be understood that the multi-blockchain data processing apparatus 2 may be a computer program (including program code) run in a blockchain node (for example, the foregoing consensus node 12c). For example, the multi-blockchain data processing apparatus 2 may be application software. It may be understood that the multi-blockchain data processing apparatus 2 may be configured to perform the corresponding steps in the method provided in the embodiments of this disclosure. As shown in FIG. 8, the multi-blockchain data processing apparatus 2 may include a second service obtaining module 21, a cross-chain reading request transmission module 22, and a second service execution module 23.

The second service obtaining module 21 is configured to obtain a second service requested by a second service object, and invoke a second cross-chain reading contract on a second chain based on the second service to read second service associated information associated with the second service from a target chain, The second chain is a blockchain in the second chain network. The target chain is a blockchain in a target chain network. The target chain network is independent of the second chain network. The second chain is different from the target chain.

The cross-chain reading request transmission module 22 is configured to invoke, in response to determining, based on the second service associated information, that the second service object has a second service processing permission corresponding to the second service, the second cross-chain reading contract to generate a cross-chain reading request associated with the second service, and transmit the cross-chain reading request to a first consensus node in a first chain network. The cross-chain reading request is used for instructing the first consensus node to read service data associated with the second service from a first chain corresponding to the first chain network. The first chain network is independent of the second chain network and the target chain network. The service data is determined by the first consensus node by invoking a first service processing contract on the first chain in response to determining, based on the first service associated information, that a first service object has a first service processing permission corresponding to a first service. The first service associated information is read by the first consensus node from the target chain by invoking a first cross-chain reading contract on the first chain based on the first service.

The second service execution module 23 is configured to receive core data in the service data returned by the first consensus node based on the cross-chain reading request, perform the second service based on the core data, and write a second service execution result corresponding to the second service to the second chain.

For specific implementations of the second service obtaining module 21, the cross-chain reading request transmission module 22, and the second service execution module 23, refer to the descriptions about step S201 to step S203 in the embodiment corresponding to FIG. 4. Details are not described herein again. In addition, descriptions about beneficial effects of the same method are not described herein again.

Figure 11:
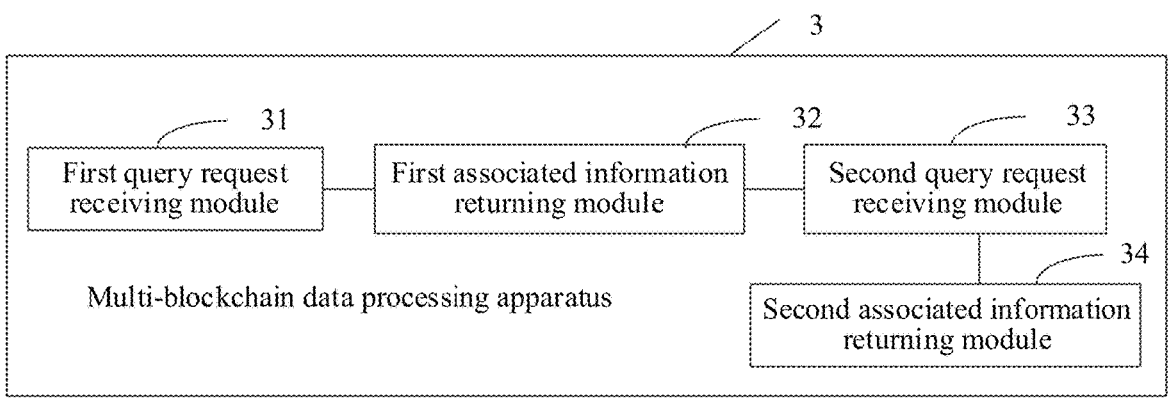
FIG. 11 is a schematic diagram of a structure of a multi-blockchain data processing apparatus according to an embodiment of this disclosure.

Further, refer to FIG. 11. FIG. 11 is a schematic diagram of a structure of a multi-blockchain data processing apparatus according to an embodiment of this disclosure. As shown in FIG. 11, the multi-blockchain data processing apparatus 3 may be used in a target consensus node. The target consensus node may be any blockchain node in a target chain network (for example, the foregoing consensus network 100a). For example, the target consensus node may be the consensus node 10c in the embodiment corresponding to FIG. 1. It is to be understood that the multi-blockchain data processing apparatus 3 may be a computer program (including program code) run in a blockchain node (for example, the foregoing consensus node 10c). For example, the multi-blockchain data processing apparatus 3 may be application software. It may be understood that the multi-blockchain data processing apparatus 3 may be configured to perform the corresponding steps in the method provided in the embodiments of this disclosure. As shown in FIG. 9, the multi-blockchain data processing apparatus 3 may include first query request receiving module 31, a first associated information returning module 32, a second query request receiving module 33, and a second associated information returning module 34.

The first query request receiving module 31 is configured to receive a first service permission query request transmitted by a first consensus node in a first chain network. The first service permission query request is determined by the first consensus node by invoking a first cross-chain reading contract on a first chain in response to obtaining a first service submitted by a first service object. The first chain is a blockchain in the first chain network. The first chain network is independent of the target chain network.

The first associated information returning module 32 is configured to read, from a target chain corresponding to the target chain network based on the first service permission query request, first service associated information associated with the first service, and return the first service associated information to the first consensus node, so that the first consensus node invokes, in response to determining, based on the first service associated information, that the first service object has a first service processing permission corresponding to the first service, a first service processing contract on the first chain to perform the first service, to obtain a first service execution result for writing to the first chain. The first service execution result includes service data indicated by the first service.

The second query request receiving module 33 is configured to receive a second service permission query request transmitted by a second consensus node in a second chain network. The second service permission query request is determined by the second consensus node by invoking a second cross-chain reading contract on a second chain corresponding to the second chain network in response to obtaining a second service submitted by a second service object. The second chain network is independent of the first chain network and the target chain network.

The second associated information returning module 34 is configured to read, from the target chain based on the second service permission query request, second service associated information associated with the second service, and return the second service associated information to the second consensus node, so that the second consensus node invokes, in response to determining, based on the second service associated information, that the second service object has a second service processing permission corresponding to the second service, a second cross-chain reading contract to generate a cross-chain reading request that is for transmission to the first consensus node and that is associated with the second service. The cross-chain reading request is used for instructing the first consensus node to read the service data from the first chain.

For specific implementations of the first query request receiving module 31, the first associated information returning module 32, the second query request receiving module 33, and the second associated information returning module 34, refer to the descriptions about step S301 to step S304 in the embodiment corresponding to the foregoing FIG. 5. Details are not described herein again. In addition, descriptions about same beneficial effects of the same method are not described herein again.

Figure 12:
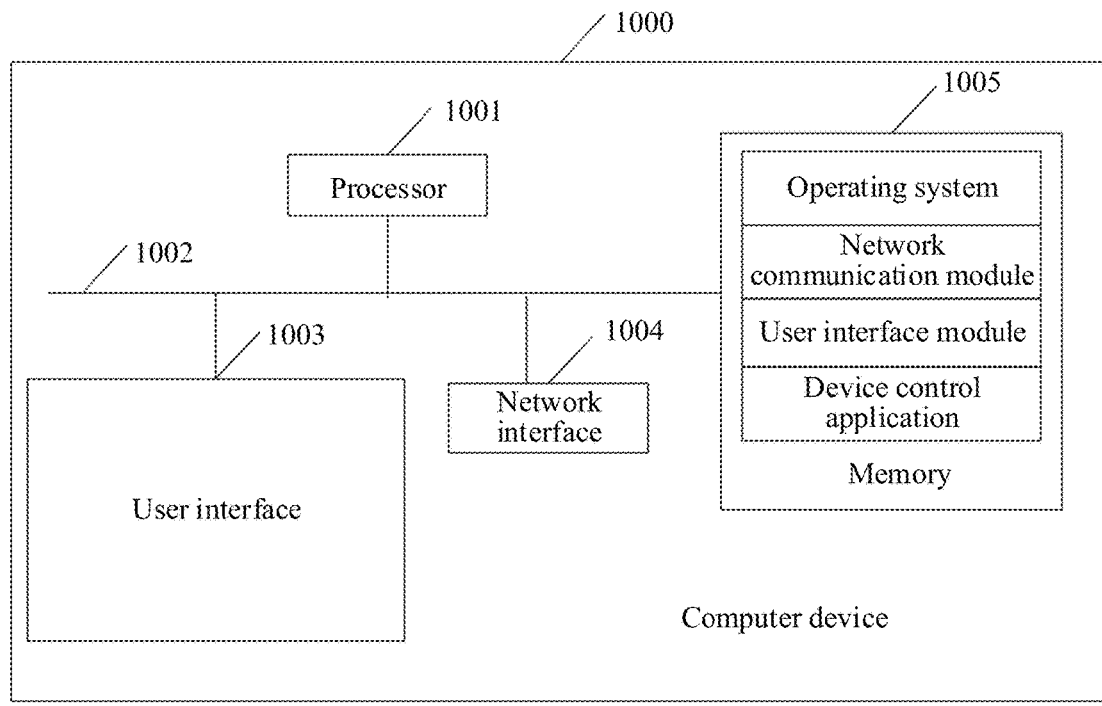
FIG. 12 is a schematic diagram of a structure of a computer device according to an embodiment of this disclosure.

Further, Refer to FIG. 12. FIG. 12 is a schematic diagram of a structure of a computer device according to an embodiment of this disclosure. As shown in FIG. 12, the computer device 1000 may be a user terminal or a server. This is not limited herein. For ease of understanding, an example in which the computer device is a server is used in this disclosure. The computer device 1000 may include a processor 1001 (processing circuitry), a network interface 1004, and a memory 1005 (non-transitory computer-readable storage medium). In addition, the computer device 1000 may further include a user interface 1003 and at least one communication bus 1002. The communication bus 1002 is configured to implement connection and communication between these components. The user interface 1003 may further include a standard wired interface and wireless interface. The network interface 1004 may include a standard wired interface and a standard wireless interface (for example, a Wi-Fi interface). The memory 1005 may be a high-speed random access memory (RAM), or a non-volatile memory, for example, at least one disk memory. The memory 1005 may be at least one storage apparatus far away from the processor 1001. As shown in FIG. 12, as a non-transitory computer-readable storage medium, the memory 1005 may include an operating system, a network communication module, a user interface module, and a device control application.

The network interface 1004 in the computer device 1000 may further provide a network communication function. In the computer device 1000 shown in FIG. 12, the network interface 1004 may provide a network communication function. The user interface 1003 is mainly configured to provide an input interface for a user. The processor 1001 may be configured to invoke the device control application stored in the memory 1005, to execute the descriptions about the multi-blockchain data processing method in the embodiment corresponding to FIG. 3, FIG. 6, FIG. 7, or FIG. 8 and further execute the descriptions about the multi-blockchain data processing apparatus (that is, the foregoing multi-blockchain data processing apparatus 1, multi-blockchain data processing apparatus 2, or multi-blockchain data processing apparatus 3) in the embodiment corresponding to FIG. 9, FIG. 10, or FIG. 11. Details are not described herein again. In addition, descriptions about beneficial effects of the same method are not described herein again.

In addition, an embodiment of this disclosure further provides a computer-readable storage medium. The computer-readable storage medium stores a computer program executed by the foregoing multi-blockchain data processing apparatus 1, multi-blockchain data processing apparatus 2, or multi-blockchain data processing apparatus 3. The computer program includes program instructions. The processor, when executing the program instructions, may execute the descriptions about the multi-blockchain data processing method in the embodiment corresponding to FIG. 3, FIG. 6, FIG. 7, or FIG. 8. Therefore, details are not described herein again. In addition, descriptions about beneficial effects of the same method are not described herein again. For technical details that are not disclosed in the embodiment of the computer-readable storage medium involved in this disclosure, refer to the descriptions in the method embodiment of this disclosure. In an example, the computer instructions may be deployed to be executed on one computing device, executed on a plurality of computing devices at one location, or executed on a plurality of computing devices distributed at a plurality of locations and connected to each other through a communication network. The plurality of computing devices distributed at the plurality of locations and connected to each other through the communication network may form a blockchain system.

In addition, an embodiment of this disclosure further provides a computer program product or computer program. The computer program product or computer program may include computer instructions. The computer instructions may be stored in a computer-readable storage medium. A processor of a computer device reads the computer instructions from the computer-readable storage medium. The processor may execute the computer instructions, so that the computer device executes the descriptions about the multi-blockchain data processing method in the embodiment corresponding to FIG. 3, FIG. 6, FIG. 7, or FIG. 8. Therefore, details are not described herein again. In addition, descriptions about beneficial effects of the same method are not described herein again. For technical details that are not disclosed in the embodiment of the computer program product or computer program involved in this disclosure, refer to the descriptions in the method embodiment of this disclosure.

Figure 13:
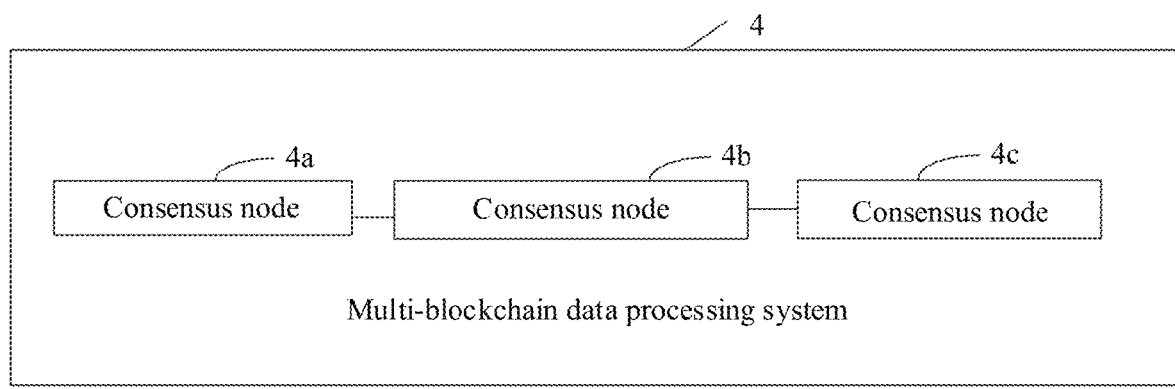
FIG. 13 is a schematic diagram of a multi-blockchain data processing system according to an embodiment of this disclosure.

Further, refer to FIG. 13. FIG. 13 is a schematic diagram of a multi-blockchain data processing system according to an embodiment of this disclosure. The multi-blockchain data processing system 4 may include a consensus node 4a, a consensus node 4b, and a consensus node 4c. The consensus node 4a may be the target consensus node that is described in the embodiment corresponding to FIG. 7 and that is located in the target chain network. The target consensus node may be any blockchain node in the consensus network 100a shown in FIG. 1. Details are not described herein again. The consensus node 4b may be the first consensus node that is described in the embodiment corresponding to FIG. 3 and that is located in the first chain network. The first consensus node may be any blockchain node in the consensus network 200a shown in FIG. 1. Details are not described herein again. The consensus node 4c may be the second consensus node that is described in the embodiment corresponding to FIG. 6 and that is located in the second chain network. The second consensus node may be any blockchain node in the consensus network 300a shown in FIG. 1. Details are not described herein again. In addition, descriptions about beneficial effects of the same method are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A multi-blockchain data processing method, comprising:
   receiving a first service request from a first service node, and invoking a first cross-chain reading contract on a first chain to read first service associated information from a target chain, the first chain being a blockchain in a first chain network, the target chain being a blockchain in a target chain network independent of the first chain network;
   in response to determining, based on the first service associated information, that the first service node has first service processing permission corresponding to the first service, invoking, by a first consensus node in the first chain network, a first service processing contract on the first chain to perform the first service and obtain a first service execution result comprising service data generated by the first service, and writing the first service execution result to the first chain; and
   in response to obtaining a cross-chain reading request transmitted by a second consensus node based on a second cross-chain reading contract on a second chain, reading, by the first consensus node, the service data from the first chain based on a second service indicated in the cross-chain reading request, and returning at least a portion of the service data to the second consensus node, the second consensus node being configured to write a second service execution result generated by the second service to the second chain after performing the second service based on the at least a portion of the service data generated by the first service, the second chain being a blockchain in a second chain network comprising the second consensus node, and the second chain network being independent of the first chain network and the target chain network.

2. The method according to claim 1, wherein
   a chain entry corresponding to the first chain network is a first chain entry;
   the first chain entry stores registration data information of authorized nodes registered by the first consensus node from the target chain through the first cross-chain reading contract at a first cross-chain reading timestamp; and
   the obtaining the first service request from a first service node, and invoking the first cross-chain reading contract comprises:
      obtaining, through the first chain entry of the first chain network, a first service processing request transmitted by the first service node based on the first service, the first service processing request including transaction service data submitted by the first service node for performing the first service and first signature information of the first service node, the first signature information being obtained by the first service node signing the transaction service data based on first private key information of the first service node obtained after the first service node performs identity registration through an object identity management contract in the target chain;
      obtaining the first signature information from the first service processing request, and performing signature verification on the first signature information based on the registration data information of the authorized nodes stored in the first chain entry, to obtain a signature verification result of the first service node;
      when the signature verification result of the first service node indicates that signature verification has succeeded, determining that the first service node is an authorized node, and determining, based on the transaction service data, the first service associated with the first service node; and
      invoking the first cross-chain reading contract based on the first service to read the first service associated information associated with the first service from the target chain.

3. The method according to claim 2, wherein
   the registration data information of the authorized nodes comprises a public key certificate of the authorized nodes;
   the public key certificate of each authorized node is obtained after a target consensus node in the target chain network invokes the object identity management contract in the target chain to perform identity registration on node data information submitted by the respective authorized node; and
   the obtaining the first signature information from the first service processing request, and the performing the signature verification on the first signature information comprises:
      obtaining the first signature information from the first service processing request, and obtaining the public key certificate of the authorized nodes from the registration data information of the authorized nodes stored in the first chain entry, a public key certificate of one authorized node comprising public key information of the one authorized node;

searching, in the public key certificates of the authorized nodes, for a public key certificate of the first service node, and when the public key certificate of the first service node is found, determining the found public key certificate of the first service node as a first public key certificate, and determining public key information in the first public key certificate as first public key information of the first service node; and performing signature verification on the first signature information based on the first public key certificate and the first public key information to obtain the signature verification result of the first service node.

4. The method according to claim 3, wherein the performing the signature verification on the first signature information comprises:

determining certificate data information of the first public key certificate as to-be-processed certificate information, and invoking a certificate data reading method in the first cross-chain reading contract at a second cross-chain reading timestamp to read the public key certificate of the first service node from the target chain, the second cross-chain reading timestamp being a next cross-chain reading timestamp after the first cross-chain reading timestamp;

determining the read certificate data information in the public key certificate of the first service node as target certificate information; and when the to-be-processed certificate information is consistent with the target certificate information, performing signature verification on the first signature information based on the first public key certificate, and determining a verification result indicating that signature verification has succeeded as the signature verification result of the first service node.

5. The method according to claim 3, wherein the method further comprises:

determining the first service node as an illegal service node when the public key certificate of the first service node is not found among the public key certificates of the authorized nodes, and rejecting the first service processing request transmitted by the illegal service node.

6. The method according to claim 2, wherein the invoking the first cross-chain reading contract comprises:

invoking, based on the first service, a permission contract reading method in the first cross-chain reading contract to generate a permission contract access request of a target consensus node in the target chain network, the permission contract access request being used by the target consensus node to invoke an object permission management contract on the target chain to obtain the first service associated information associated with the first service; and receiving the first service associated information returned by the target consensus node based on the permission contract access request.

7. The method according to claim 1, wherein the first service associated information comprises a service permission type configured for the first service node, a cumulative service volume of the first service node of the service permission type in service duration, and a cumulative service threshold; and the invoking, by the first consensus node, the first service processing contract on the first chain comprises:

determining that the first service node has the first service processing permission corresponding to the first service in response to determining, based on the first service associated information, that the service permission type of the first service node is a billing permission type and the cumulative service volume of the first service node in the service duration does not reach the cumulative service threshold;

obtaining, based on the first service processing permission, a contract invoking address and a contract invoking name that are associated with the billing permission type, invoking an electronic bill issuing contract on the first chain based on the contract invoking address and the contract invoking name to integrate transaction service data corresponding to the first service and key bill information associated with an electronic bill issuing service in the first service and issue an electronic bill for the first service node based on integrated key bill information, and determining the issued electronic bill as service data indicated by the first service;

determining the key bill information, the service data, and the electronic bill issuing contract as the first service execution result of the electronic bill issuing service in the first service, and transmitting a first block comprising the first service execution result to a verification consensus node on the first chain, so that the verification consensus node performs block verification on the first block to obtain a block verification result, the verification consensus node being a consensus node other than the first consensus node in the first chain network; and receiving the block verification result returned by the verification consensus node, and writing the first block to the first chain when the block verification result indicates that block verification has succeeded.

8. The method according to claim 7, wherein the key bill information comprises auxiliary metadata information read from the target chain, and the auxiliary metadata information comprises a first electronic bill template and a target tax calculation rule associated with the first electronic bill template;

the first electronic bill template is an electronic bill template generated when the target consensus node on the target chain invokes a metadata management contract on the target chain to perform change and uploading on a second electronic bill template;

the second electronic bill template is a previous electronic bill template prior to the first electronic bill template; and metadata change information is submitted by a service management node associated with the target consensus node.

9. The method according to claim 1, wherein the first service comprises at least one of: an electronic bill issuing service, an electronic bill circulation service, an electronic bill reversal service, and an electronic bill archiving service;

the first service processing contract comprises at least an electronic bill issuing contract for performing the electronic bill issuing service, an electronic bill circulation contract for performing the electronic bill circulation service, an electronic bill reversal contract for performing the electronic bill reversal service, or an electronic bill archiving contract for performing the electronic bill archiving service;

the electronic bill issuing service enables the first consensus node to invoke the electronic bill issuing contract on the first chain to issue an electronic invoice for the first service node;

the electronic bill circulation service enables the first consensus node to invoke the electronic bill circulation contract on the first chain to circulate the electronic invoice from the first service node to a second service node;

the electronic bill reversal service enables the first consensus node to invoke the electronic bill reversal service on the first chain to issue a credit note corresponding to the electronic invoice, and the credit note changing related bill information in the electronic invoice; and the electronic bill archiving service enables the first consensus node to invoke the electronic bill archiving contract on the first chain to perform cold storage processing on an electronic invoice satisfying a bill archiving condition on the first chain.

10. The method according to claim 1, wherein the reading the service data from the first chain based on a second service indicated in the cross-chain reading request comprises:

when the cross-chain reading request is transmitted by the second consensus node based on the second cross-chain reading contract on the second chain, obtaining, from the cross-chain reading request, the second service submitted by a second service node through a second service entry associated with the second chain, the second service entry allowing, in response to determining that the second service node has a permission to process the second service on the second chain, the second service node to invoke the second cross-chain reading contract through the second consensus node; and reading the service data from the first chain based on cross-chain request data information indicated by the second service, determining core data in the read service data as cross-chain request response information corresponding to the cross-chain reading request, and returning the cross-chain request response information to the second consensus node, so that the second consensus node invokes, based on the cross-chain request response information, a second service contract on the second chain to perform the second service.

11. The method according to claim 1, wherein the method further comprises:

specifying, in a target transaction corresponding to the first service execution result during writing of the first service execution result to the first chain, a processing terminal identifier of a service data processing terminal associated with the service data, the processing terminal identifier indicating that the service data processing terminal has a function of obtaining, through clearing, the service data from the first chain; and obtaining, in response to obtaining a transaction clearing request transmitted by the service data processing terminal, the target transaction from the first chain based on the processing terminal identifier included in the transaction clearing request, obtaining, through clearing, the service data from the first service execution result comprised in the target transaction, and returning the service data to the service data processing terminal, so that the service data processing terminal performs data analysis on the service data.

12. A multi-blockchain data processing method, comprising:

receiving a second service request from a second service node, and invoking a second cross-chain reading contract on a second chain to read second service associated information from a target chain, the second chain being a blockchain in a second chain network, the target chain being a blockchain in a target chain network independent of the second chain network;

in response to determining, based on the second service associated information, that the second service node has a second service processing permission corresponding to the second service, invoking, by a second consensus node, a second cross-chain reading contract to generate a cross-chain reading request associated with the second service, and transmitting the cross-chain reading request to a first consensus node in a first chain network, the cross-chain reading request requesting the first consensus node to read service data associated with the second service from a first chain corresponding to the first chain network independent of the second chain network and the target chain network, the service data associated with the second service being obtained by the first consensus node by invoking a first service processing contract on the first chain in response to determining, based on the first service associated information, that a first service node has a first service processing permission corresponding to a first service, and the first service associated information being read by the first consensus node from the target chain by invoking a first cross-chain reading contract on the first chain based on the first service; and receiving at least a portion of the service data returned by the first consensus node based on the cross-chain reading request, performing the second service based on the at least a portion of the service data, and writing a second service execution result corresponding to the second service to the second chain.

13. A multi-blockchain data processing apparatus, comprising:

processing circuitry of a first consensus node in a first chain network, the processing circuitry being configured to receive a first service request from a first service node, and invoke a first cross-chain reading contract on a first chain to read first service associated information from a target chain, the first chain being a blockchain in the first chain network, the target chain being a blockchain in a target chain network independent of the first chain network;

in response to determining, based on the first service associated information, that the first service node has a first service processing permission corresponding to the first service, invoke a first service processing contract on the first chain to perform the first service and obtain a first service execution result comprising service data generated by the first service, and write the first service execution result to the first chain; and in response to obtaining a cross-chain reading request transmitted by a second consensus node based on a second cross-chain reading contract on a second chain, read the service data from the first chain based on a second service indicated in the cross-chain reading request, and return at least a portion of the service data to the second consensus node, the second consensus node being configured to write a second service execution result generated by the second service to the second chain after performing the second service based on the at least a portion of the service data generated by the first service, the second chain being a blockchain in a second chain network comprising the second consensus node, and the second chain network being independent of the first chain network and the target chain network.

14. The apparatus according to claim 13, wherein
a chain entry corresponding to the first chain network is a first chain entry;
the first chain entry stores registration data information of authorized nodes registered by the first consensus node from the target chain through the first cross-chain reading contract at a first cross-chain reading timestamp; and
the processing circuitry is further configured to:
  obtain, through the first chain entry of the first chain network, a first service processing request transmitted by the first service node based on the first service, the first service processing request including transaction service data submitted by the first service node for performing the first service and first signature information of the first service node, the first signature information being obtained by the first service node signing the transaction service data based on first private key information of the first service node obtained after the first service node performs identity registration through an object identity management contract in the target chain;
  obtain the first signature information from the first service processing request, and perform signature verification on the first signature information based on the registration data information of the authorized nodes stored in the first chain entry, to obtain a signature verification result of the first service node;
  when the signature verification result of the first service node indicates that signature verification has succeeded, determine that the first service node is an authorized node, and determine, based on the transaction service data, the first service associated with the first service node; and
  invoke the first cross-chain reading contract based on the first service to read the first service associated information associated with the first service from the target chain.

15. The apparatus according to claim 14, wherein
the registration data information of the authorized nodes comprises a public key certificate of the authorized nodes;
the public key certificate of each authorized node is obtained after a target consensus node in the target chain network invokes the object identity management contract in the target chain to perform identity registration on node data information submitted by the respective authorized node; and
the processing circuitry is further configured to:
  obtain the first signature information from the first service processing request, and obtain the public key certificate of the authorized nodes from the registration data information of the authorized nodes stored in the first chain entry, a public key certificate of one authorized node comprising public key information of the one authorized node;
  search, in the public key certificates of the authorized nodes, for a public key certificate of the first service node, and when the public key certificate of the first service node is found, determine the found public key certificate of the first service node as a first public key certificate, and determine public key information in the first public key certificate as first public key information of the first service node; and
  perform signature verification on the first signature information based on the first public key certificate and the first public key information to obtain the signature verification result of the first service node.

16. The apparatus according to claim 15, wherein the processing circuitry is further configured to:
  determine certificate data information of the first public key certificate as to-be-processed certificate information, and invoke a certificate data reading method in the first cross-chain reading contract at a second cross-chain reading timestamp to read the public key certificate of the first service node from the target chain, the second cross-chain reading timestamp being a next cross-chain reading timestamp after the first cross-chain reading timestamp;
  determine the read certificate data information in the public key certificate of the first service node as target certificate information; and
  when the to-be-processed certificate information is consistent with the target certificate information, perform signature verification on the first signature information based on the first public key certificate, and determine a verification result indicating that signature verification has succeeded as the signature verification result of the first service node.

17. The apparatus according to claim 15, wherein the processing circuitry is further configured to:
  determine the first service node as an illegal service node when the public key certificate of the first service node is not found among the public key certificates of the authorized nodes, and reject the first service processing request transmitted by the illegal service node.

18. The apparatus according to claim 14, wherein the processing circuitry is further configured to:
  invoke, based on the first service, a permission contract reading method in the first cross-chain reading contract to generate a permission contract access request of a target consensus node in the target chain network, the permission contract access request being used by the target consensus node to invoke an object permission management contract on the target chain to obtain the first service associated information associated with the first service; and
  receive the first service associated information returned by the target consensus node based on the permission contract access request.

19. The apparatus according to claim 13, wherein
the first service associated information comprises a service permission type configured for the first service node, a cumulative service volume of the first service node of the service permission type in service duration, and a cumulative service threshold; and
the processing circuitry is further configured to:
  determine that the first service node has the first service processing permission corresponding to the first service in response to determining, based on the first service associated information, that the service permission type of the first service node is a billing permission type and the cumulative service volume of the first service node in the service duration does not reach the cumulative service threshold;

obtain, based on the first service processing permission, a contract invoking address and a contract invoking name that are associated with the billing permission type, invoke an electronic bill issuing contract on the first chain based on the contract invoking address and the contract invoking name to integrate transaction service data corresponding to the first service and key bill information associated with an electronic bill issuing service in the first service and issue an electronic bill for the first service node based on integrated key bill information, and determine the issued electronic bill as service data indicated by the first service;

determine the key bill information, the service data, and the electronic bill issuing contract as the first service execution result of the electronic bill issuing service in the first service, and transmit a first block comprising the first service execution result to a verification consensus node on the first chain, so that the verification consensus node performs block verification on the first block to obtain a block verification result, the verification consensus node being a consensus node other than the first consensus node in the first chain network; and receive the block verification result returned by the verification consensus node, and write the first block to the first chain when the block verification result indicates that block verification has succeeded.

20. The apparatus according to claim 19, wherein the key bill information comprises auxiliary metadata information read from the target chain, and the auxiliary metadata information comprises a first electronic bill template and a target tax calculation rule associated with the first electronic bill template;

the first electronic bill template is an electronic bill template generated when the target consensus node on the target chain invokes a metadata management contract on the target chain to perform change and uploading on a second electronic bill template;

the second electronic bill template is a previous electronic bill template prior to the first electronic bill template; and metadata change information is submitted by a service management node associated with the target consensus node.

* * * * *